United States Patent
Berntorp et al.

(10) Patent No.: US 10,976,444 B2
(45) Date of Patent: Apr. 13, 2021

(54) SYSTEM AND METHOD FOR GNSS AMBIGUITY RESOLUTION

(71) Applicant: Mitsubishi Electric Research Laboratories, Inc., Cambridge, MA (US)

(72) Inventors: Karl Berntorp, SKA (SE); Avishai Weiss, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 452 days.

(21) Appl. No.: 15/938,385

(22) Filed: Mar. 28, 2018

(65) Prior Publication Data

US 2019/0302274 A1    Oct. 3, 2019

(51) Int. Cl.
*G01S 19/44* (2010.01)
*G01S 19/39* (2010.01)
*G01S 19/22* (2010.01)

(52) U.S. Cl.
CPC ............ *G01S 19/44* (2013.01); *G01S 19/22* (2013.01); *G01S 19/393* (2019.08)

(58) Field of Classification Search
CPC ......... G01S 19/44; G01S 19/39; G01S 19/393
See application file for complete search history.

(56) References Cited

U.S. PATENT DOCUMENTS 6,259,398 B1 * 7/2001 Riley ................. G01S 19/44
                                                   342/357.26
7,961,143 B2    6/2011 Dai et al.
(Continued)

FOREIGN PATENT DOCUMENTS

EP         479588 A2    7/2012
WO      2017031236      8/2016

OTHER PUBLICATIONS

Hwang et al., "Relative GPS Carver-Phase positioning using particle filters with position samples," 2009 American Control Conference, Hyatt Regency Riverfront, St. Louis, MO, USA. Jun. 10-12, 2009. IEEE. pp. 4171-4177.

*Primary Examiner* — Cassi J Galt
(74) *Attorney, Agent, or Firm* — Gennadiy Vinokur; Hironori Tsukamoto

(57) ABSTRACT

A positioning system for a global navigational satellite system (GNSS) includes a receiver to receive carrier signals and code signals transmitted from a set of GNSS satellites that include a carrier phase ambiguity as an unknown integer number of wavelengths of the carrier signal traveled between the satellite and the receiver, and a processor to track a position of the receiver. The processor is configured to determine a set of possible combinations of integer values of the carrier phase ambiguities consistent with the measurements of the carrier signal and the code signal according to one or combination of the motion model and the measurement model within bounds defined by one or combination of the process noise and the measurement noise and execute a set of position estimators determining positions of the receiver using different combinations of integer values of the carrier phase ambiguities selected from the set of possible combinations. Next, the processor determines the position of the receiver using a position estimator with the highest joint probability of the position of the receiver according to the measurements of the carrier and the code signals.

20 Claims, 18 Drawing Sheets

(56) References Cited

U.S. PATENT DOCUMENTS

| | | |
|---|---|---|
| 8,169,364 B2 | 5/2012 | Wirola et al. |
| 9,000,975 B2 * | 4/2015 | Wendel .................. G01S 19/44 |
| | | 342/357.27 |
| 9,322,918 B2 | 4/2016 | Vollath et al. |
| 9,817,129 B2 | 11/2017 | Hansen, Jr. et al. |
| 2011/0140959 A1 * | 6/2011 | Vollath .................. G01S 19/44 |
| | | 342/357.27 |

* cited by examiner

| Notation | Description | Unit |
|---|---|---|
| $P$ | Code observation | m |
| $\rho$ | Distance between the receiver and the satellite | m |
| $c$ | Speed of light | m/s |
| $\delta T$ | Receiver clock bias | s |
| $\delta t$ | Satellite clock bias | s |
| $I$ | Ionospheric delay | m |
| $T$ | Tropospheric delay | m |
| $\varepsilon$ | Code observation noise | m |
| $\lambda$ | Carrier wavelength | m |
| $\Phi$ | Carrier phase observation | cycles |
| $n$ | Integer ambiguity | cycles |
| $\eta$ | Carrier observation noise | m |

FIG. 3

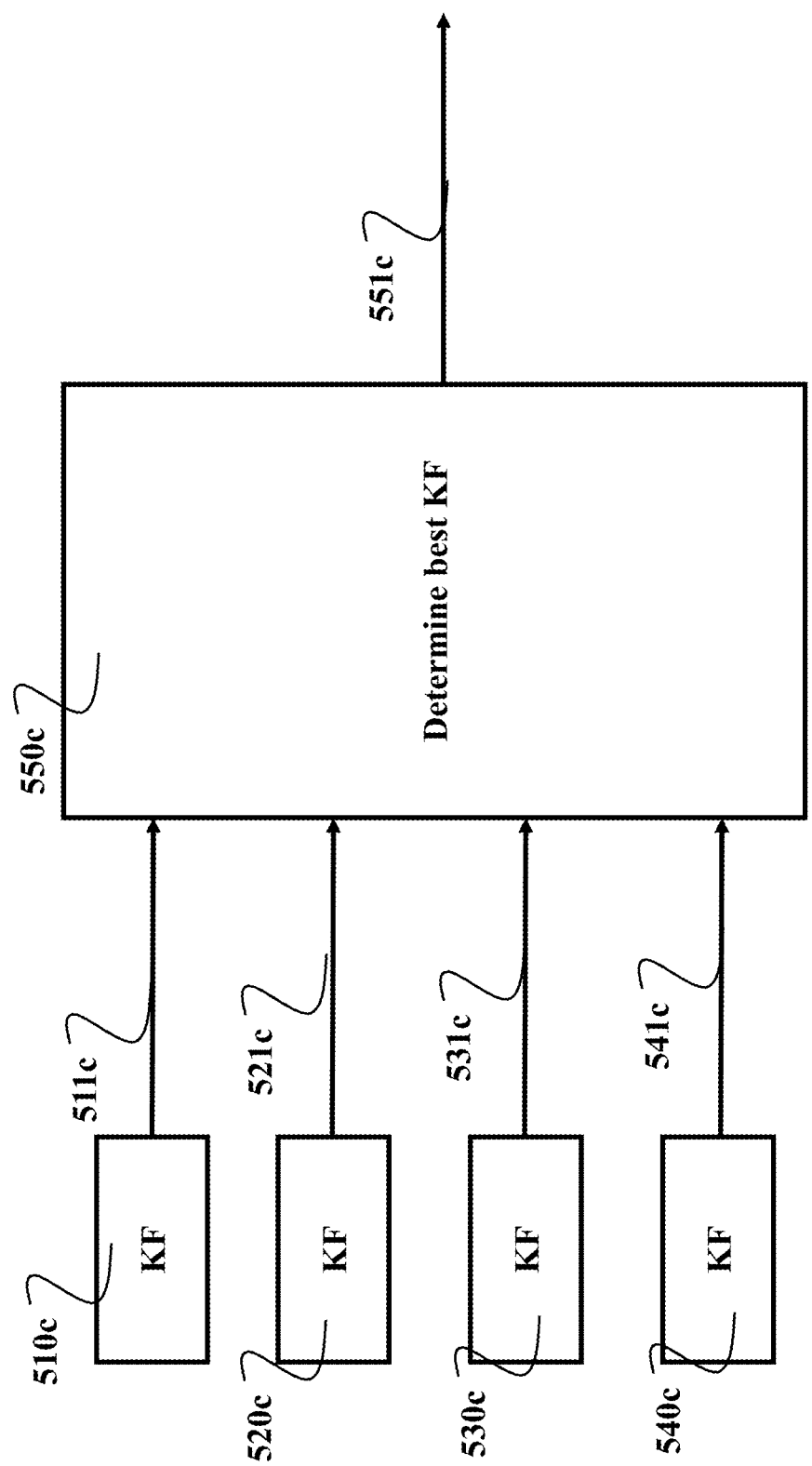

SYSTEM AND METHOD FOR GNSS AMBIGUITY RESOLUTION

TECHNICAL FIELD

This invention relates generally to positioning systems, such as the global positioning system (GPS) or the Quasi-Zenith Satellite System (QZSS), and more particularly to resolve integer ambiguities in carrier-phase measurements by receivers in such positioning systems.

BACKGROUND

A Global Navigation Satellite System (GNSS) is a system of satellites that can be used for determining the geographic location of a mobile receiver with respect to the earth. GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile receiver, with the purpose of achieving quicker and more accurate calculation of the mobile receiver's geographic position.

Various position estimation methods are known wherein the position calculations are based on repeated measurement of the so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g. when the receiver passes under a bridge or through a tunnel). Generally, in such cases, the integer ambiguity values are lost and must be re-determined. This process can take from a few seconds to several minutes. In fact, the presence of significant multipath errors or unmodeled systematic biases in one or more measurements of either pseudorange or carrier phase may make it difficult with present commercial positioning systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge. Furthermore, loss-of-lock can also occur due to a discontinuity in a receiver's continuous phase lock on a signal, which is referred to as a cycle slip. For instance, cycle slips can be caused by a power loss, a failure of the receiver software, or a malfunctioning satellite oscillator. In addition, cycle slip can be caused by changing ionospheric conditions.

Consequently, there is a need for a method and a system for integer ambiguity resolution. Current methods use various linear estimation methods to estimate the integer ambiguities, see, e.g., U.S. Pat. No. 7,961,143. However, the equations describing the carrier phase measurements are nonlinear, and sometimes several ambiguity values are equally likely allowing the linear estimation methods to select the incorrect ambiguity value. Furthermore, various approaches are based on a particular choice of a motion model of the ambiguities, which however in practice is unknown, since physical modeling of the cycle-slip behavior is intractable.

Accordingly, there is a need for a method and a system for resolving integer ambiguities in GNSS systems, which can be used for improving accuracy of the position estimation.

SUMMARY

It is an object of some embodiments to provide a method and a system for resolving carrier phase ambiguity in Global Navigation Satellite System (GNSSs), which can be used for improved positioning performance. As referred herein, a carrier phase ambiguity is an unknown integer number of wavelengths of the carrier signal traveled between the satellite and the receiver. To that end, the carrier phase ambiguity is also referred as integer ambiguity in GNSS.

Some embodiments are based on recognition that the integer number of wavelengths of the carrier signal traveled between the satellite and the receiver can be any arbitrarily large number depending on the mutual positions of the GNSS receiver and the GNSS satellites. However, the range defining the variation of possible values of the carrier phase ambiguity at any given epoch is finite and is relatively small. This is because any possible value of the carrier phase ambiguity should be consistent with the motion and the measurement models of the GNSS receiver. Those models include noise allowing variations of the carrier phase ambiguity, however, the noise is bounded making such variations finite.

In addition, due to the inherent random noise and errors of the GNSS transmitter and the GNSS receiver, those models are probabilistic, thus allowing several possible values of the carrier phase ambiguity at any given epoch to be consistent with those models with different probabilities. However, through a number of experiments, some embodiments are based on realization that the probabilistic nature of those models is captured by a probability density function defined by float values. Because the carrier phase ambiguity is an integer number, discretization of likely values of the probability density function on the integer basis results in a finite set of possible integer values of carrier phase ambiguity. Other embodiments are based on the realization that the random noise characteristics of the carrier phase and code signals can be described by a probability density function with a priori determined parameters, such as a variance of the probability density function. That is, the probability density function relating the measurements to the position of the receiver and the integer ambiguities can be used to determine the range of ambiguities.

Some embodiments are based on realization that the finite number of possible integer values of carrier phase ambiguity allows to evaluate all of those possible integer values for tracking the position of the GNSS receiver. Such a realization allows to replace the evaluation of the carrier phase ambiguity with the evaluation of a position of the GNSS receiver determined using different carrier phase ambiguities. This replacement is advantageous, because the probabilistic nature of the motion of the receiver is better equipped to test the position than to test derivative of the position, such as the carrier phase ambiguity.

For example, let us say that the range of possible integer values of carrier phase ambiguities is known. Then, under this assumption, it is possible to estimate a position of the receiver using the carrier signals with different possible values of the carrier phase ambiguities and to compare those positions with a position estimated using code signals that do not suffer from the carrier phase ambiguity problem. In this example, the carrier phase ambiguity of the carrier signals producing the position closest to the position estimated using the code signals can be selected as the correct integer number of wavelengths. Unfortunately, the range of possible integer values of carrier phase ambiguities is usually unknown. In addition, the notion of close position may be misleading considering the probabilistic nature of the measurement model of the receiver.

To that end, some embodiments are based on realization that estimation of the range of possible integer values of carrier phase ambiguities as well as the selection of the integer values of carrier phase ambiguities from that range can be done probabilistically using consistency of the motion and the measurement models with respect to a probability density function (PDF) of the noise of the measurement model.

For example, some embodiments estimate values of carrier phase ambiguity for each GNSS satellite allowing the position of the receiver in the measurement model to be the position determined by the motion model according to the PDF of the measurement model. To consider the probabilistic nature of the measurement model, the resulting values of carrier phase ambiguity have a float precision. For example, some embodiments sample the PDF centered on a function defining the consistency of the position with the measurements. Such a sampling produces the float values, not the integer values of the carrier phase ambiguity, because the probabilistic nature of the measurements is such that the noise of the measurements are floating values, not integers. However, those float values can be smoothed out into a continuous representation, and the possible range of the float values can be determined and discretized on the integer basis to determine all possible integer values of the carrier phase ambiguity consistent with the motion and measurement models. Those integer values combined into combinations to represent different satellites can be further tested to estimate the best fit.

To that end, some embodiments estimate, for each combination of integer values of the carrier phase ambiguities, a value of the PDF of the measurement model including a combination of integer values of the carrier phase ambiguities fitting the current position of the receiver estimated with the motion model. Notably, to determine the range of the integer values of carrier phase ambiguity, some embodiments fit the position determined by the motion model into the measurement model and evaluate PDF of the fit. In contrast, to evaluate each combination of the integer values of the carrier phase ambiguity, some embodiments fit the integer values of the carrier phase ambiguity into the measurement models with the position determined by the motion model and evaluate the PDF of the fit and/or the PDF of the deviation of the fit. Such an evaluation allows selecting the combination of integer values of the carrier phase ambiguities resulting in the highest value of the PDF.

It is an object of some embodiments to use linear estimation methods, such as Kalman filters, to track to position of the GNSS receiver. Some embodiments are based on recognition that the Kalman filter is ill-suited to determine and/or update the carrier phase ambiguities. This is because the Kalman filter performs linear estimation based on float number, while carrier phase ambiguities change non-linearly and are integer numbers. However, the estimation of the range of integer ambiguities accompanied with testing of different combinations of carrier phase ambiguities defined by the range allows using different Kalman filters with different carrier phase ambiguities to track the position with subsequent evaluation of the best performing Kalman filter. In such a manner, the carrier phase ambiguities are resolved outside of the Kalman filter.

For instance, if there is one satellite and one receiver, there is one ambiguity to determine. When a measurement arrives, the difference between the measurement and the model of the measurement, which includes the carrier phase ambiguity, can be used to update the ambiguity to fit the measurement. Then, a Kalman filter step can be executed with the updated ambiguity. However, the measurement is uncertain, so even if there is a perfect fit with the measurement at the current time step, due to sensor noise and imperfections there is some probability that the updated ambiguity is still not correct.

Consequently, some embodiments keep several sets of ambiguities, to be consistent with the statistical properties of the measurement and measurement model. Doing in such a manner makes sure that there is always at least one ambiguity that fits with the measurement accounting for the sensor noise.

Consequently, one embodiment executes several Kalman filters, each of the Kalman filter with a fixed integer set of ambiguities, where the sets of integers form a dense covering of all possible integer values determined from the floating point values. In another embodiment, the floating point values consistency with the measurement is continuously tracked to determine if the integer values should be changed.

The determining the dense set of possible integer values can be done in several ways. One embodiment uses the probability of the floating point ambiguities to bound the possible set of integer values. For instance, all floating point ambiguities above some threshold are deemed to be possible, and can be used to bound the set of integer values.

The GNSS satellite signals may be occasionally shaded (e.g., due to buildings in urban canyon environments), or momentarily blocked (e.g. when the receiver passes under a bridge or through a tunnel). This leads to drift in the ambiguity values, and the ambiguity estimation needs to be restarted. One embodiment realizes that since the prediction of the ambiguities is done according to the measurement, the embodiment automatically detects and adjusts to the quality of the carrier signal.

Accordingly, one embodiment discloses a positioning system for a global navigational satellite system (GNSS), including a receiver to receive carrier signals and code signals transmitted from a set of GNSS satellites, each carrier signal includes a carrier phase ambiguity as an unknown integer number of wavelengths of the carrier signal traveled between the satellite and the receiver; a memory to store a motion model relating a previous position of the receiver to a current position of the receiver and a measurement model relating measurements of the carrier and the code signals to the current position of the receiver using the carrier phase ambiguities of the carrier signals, wherein the motion model is a probabilistic model subject to process noise, and wherein the measurement model is a probabilistic model subject to measurement noise; and a processor for tracking the position of the receiver.

The processor is configured to determine a set of possible combinations of integer values of the carrier phase ambiguities consistent with the measurements of the carrier and the code signals according to one or combination of the motion model and the measurement model within bounds defined by one or combination of the process noise and the measurement noise; execute a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and determine the position of the receiver using a position estimator with the highest joint probability of the position of the receiver according to the measurements of the carrier and the code signals.

Another embodiment discloses a method for position estimation for a global navigational satellite system (GNSS), wherein the method uses a processor coupled with stored instructions implementing the method, wherein the instructions, when executed by the processor carry steps of the method. The method includes receiving carrier signals and code signals transmitted from a set of GNSS satellites, each carrier signal includes a carrier phase ambiguity as an unknown integer number of wavelengths of the carrier signal traveled between the satellite and the receiver; retrieving a motion model relating a previous position of the receiver to a current position of the receiver and a measurement model relating measurements of the carrier signal and the code signal to the current position of the receiver using the carrier phase ambiguities of the carrier signals, wherein the motion model is a probabilistic model subject to process noise, and wherein the measurement model is a probabilistic model subject to measurement noise; determining a set of possible combinations of integer values of the carrier phase ambiguities consistent with the measurements of the carrier signal and the code signal according to one or combination of the motion model and the measurement model within bounds defined by one or combination of the process noise and the measurement noise; executing a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and determining the position of the receiver using a position estimator with the highest joint probability of the position of the receiver according to the measurements of the carrier and the code signals.

Yet another embodiment discloses a non-transitory computer readable storage medium embodied thereon a program executable by a processor for performing a method, the method includes receiving carrier signals and code signals transmitted from a set of GNSS satellites, each carrier signal includes a carrier phase ambiguity as an unknown integer number of wavelengths of the carrier signal traveled between the satellite and the receiver; retrieving a motion model relating a previous position of the receiver to a current position of the receiver and a measurement model relating measurements of the carrier signal and the code signal to the current position of the receiver using the carrier phase ambiguities of the carrier signals, wherein the motion model is a probabilistic model subject to process noise, and wherein the measurement model is a probabilistic model subject to measurement noise; determining a set of possible combinations of integer values of the carrier phase ambiguities consistent with the measurements of the carrier signal and the code signal according to one or combination of the motion model and the measurement model within bounds defined by one or combination of the process noise and the measurement noise; executing a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and determining the position of the receiver using a position estimator with the highest joint probability of the position of the receiver according to the measurements of the carrier and the code signals.

BRIEF DESCRIPTION OF THE DRAWINGS

FIG. 3 shows the various variables that are used in the modeling according to some embodiments;

FIG. 5C shows a block diagram of the use of several KFs to probabilistically estimate the position.

DETAILED DESCRIPTION

Figure 1A:
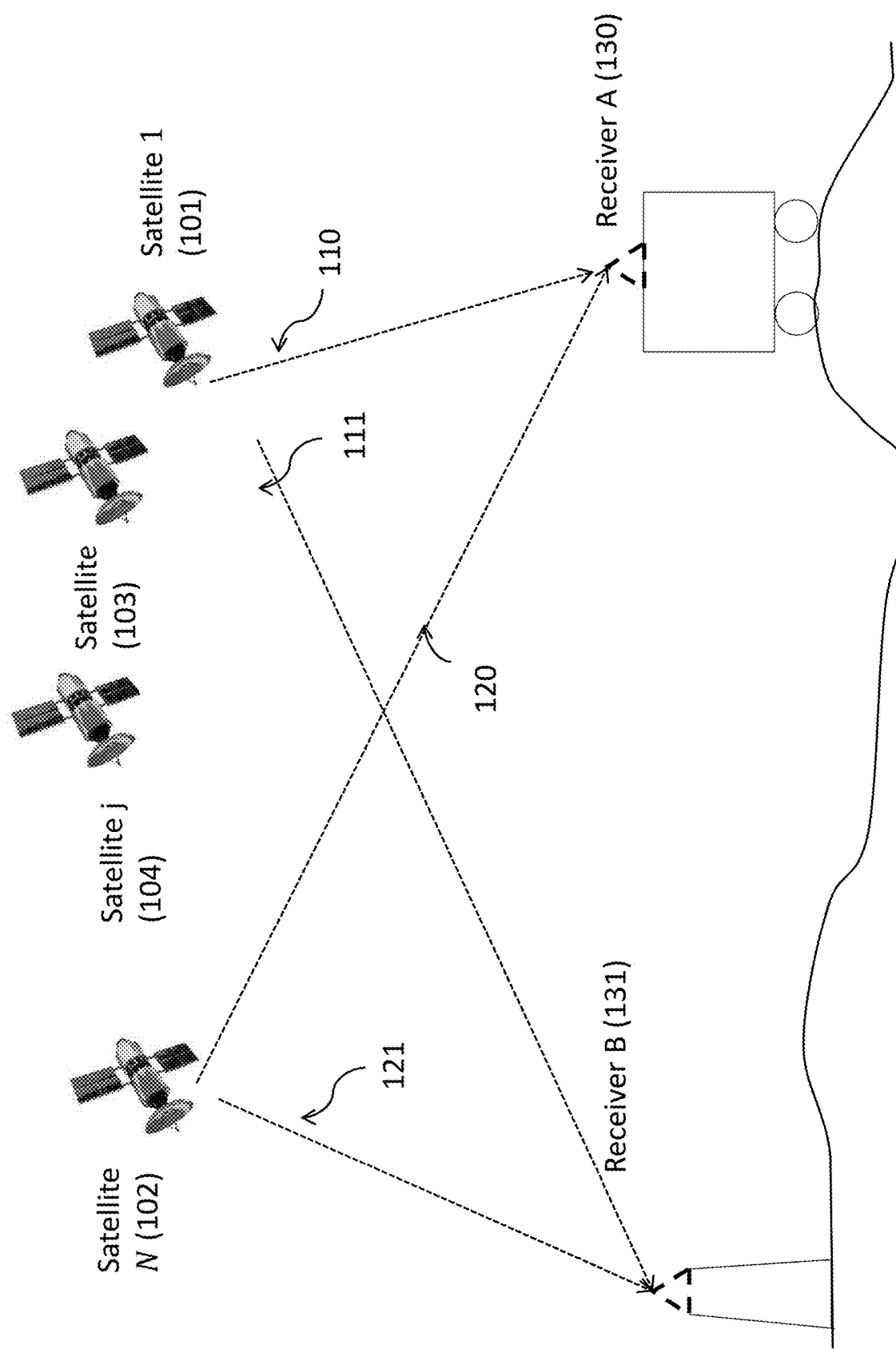
FIG. 1A shows a schematics of a global navigation satellite system (GNSS) according to some embodiments.

FIG. 1A shows a schematic of a global navigation satellite system (GNSS) according to some embodiments. For instance, the Nth satellite 102 transmits 120 and 121 code and carrier phase measurements to a set of receivers 130 and 131. For example, the receiver 130 is positioned to receive signals 110, 120, from N satellites 101, 103, 104, and 102. Similarly, the receiver 131 is positioned to receive signal 121 and 111 from the N satellites 101, 103, 104, and 102.

In various embodiments, the GNSS receiver 130 and 131 can be of different types. For example, in exemplar embodiment of FIG. 1A, the receiver 131 is a base receiver, whose position is known. For instance, the receiver 131 can be a receiver mounted on the ground. In contrast, the receiver 130 is a mobile receiver configured to move. For instance, the receiver 130 can be mounted in a cell phone, a car, or a train. In some implementations, the second receiver 131 is optional and can be used to remove uncertainties and errors due to various sources, such as atmospheric effects and errors in the internal clocks of the receivers and satellites.

Some embodiments are based on the realization that random noise characteristics of the carrier phase and code signals can be described by a probability density function (PDF) with a priori determined parameters, such as a variance of the PDF. That is, the PDF relating the measurements to the position of the receiver and the integer ambiguities can be used to determine the range of ambiguities, which results in a finite number of possible integer values.

Other embodiments are based on realization that the finite number of possible integer values of carrier phase ambiguity allows to evaluate all of those possible integer values for tracking the position of the GNSS receiver. Such a realization allows to replace the evaluation of the carrier phase ambiguity with the evaluation of a position of the GNSS receiver determined using the carrier phase ambiguity. This replacement is advantageous, because the probabilistic nature of the motion of the receiver is better equipped to test the position than to test derivative of the position, such as the carrier phase ambiguity.

Figure 1B:
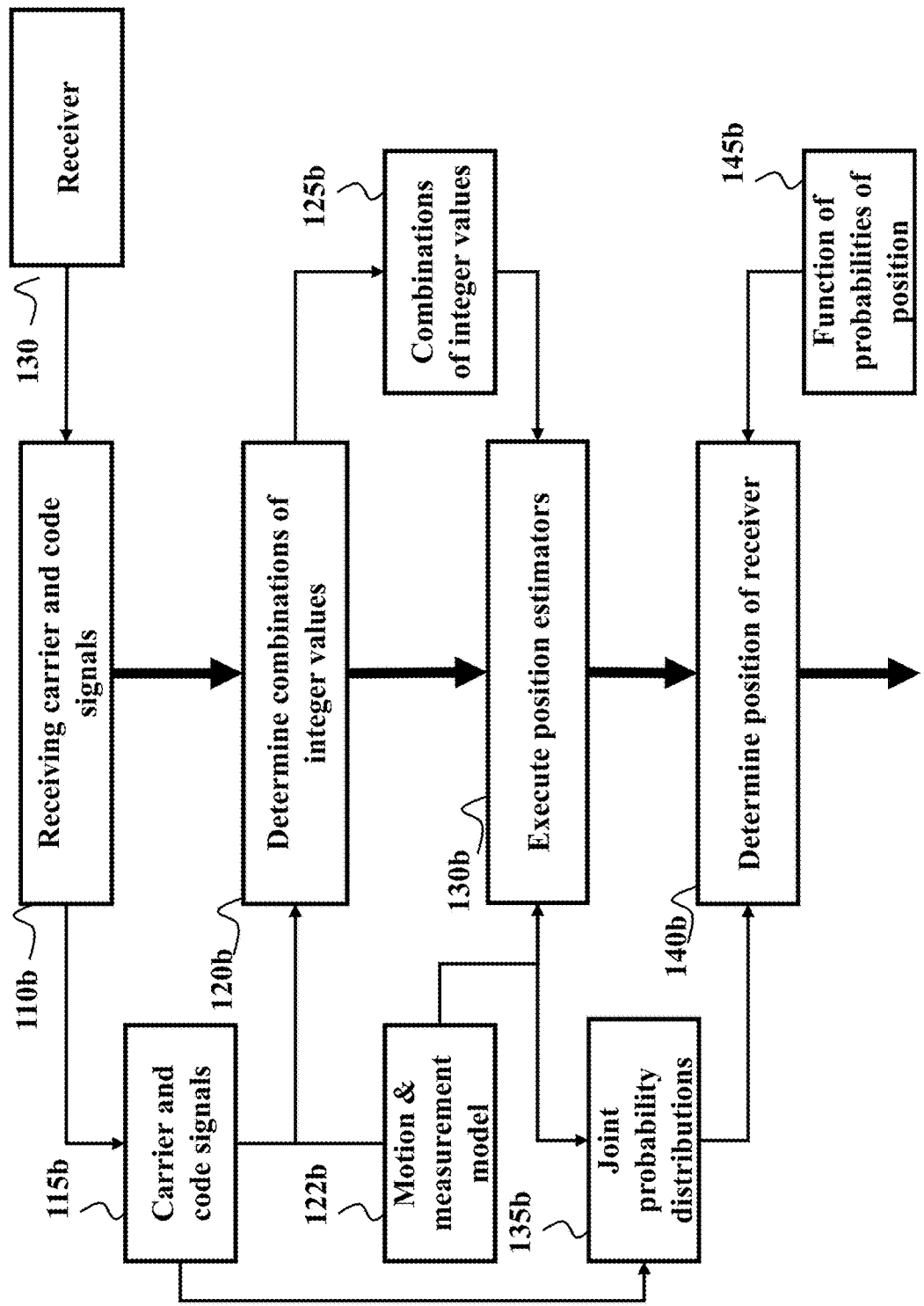
FIG. 1B shows a flowchart of a method for position estimation of a receiver according to some embodiments.

FIG. 1B shows a flowchart of a method for position estimation of a receiver 130 configured to receive 110b measurements of the carrier and code signals 115b transmitted from a set of satellites 101, 102, 103, 104 according to some embodiments. Each carrier signal includes a carrier phase ambiguity as an unknown integer number of wavelengths of the carrier signal traveled between the satellite 101, 102, 103, or 104 and the receiver 130. Next, the method retrieves 122b from a memory a motion model relating a previous position of the receiver to a current position of the receiver and a measurement model relating measurements of the carrier and the code signals 115b to the current position of the receiver using the carrier phase ambiguities of the carrier signals. Both models, i.e., the motion model and the measurement model, are probabilistic. For example, the motion model is a probabilistic model subject to process noise, and the measurement model is a probabilistic model subject to measurement noise.

The method then determines 120b a set of possible combinations of integer values 125b of the carrier phase ambiguities consistent with the measurements of the carrier and the code signals according to one or combination of the motion model and the measurement model 122b within bounds defined by one or combination of the process noise and the measurement noise. This step is based on understanding that instead of attempting to determine the carrier phase ambiguities to perform a position estimation, it is beneficial to determine and test different possible combination of the carrier phase ambiguities for the position estimation. In such a manner, the best carrier phase ambiguities can be selected using the probabilistic model better reflecting the nuances of the position estimation.

To that end, the method executes 130b a set of position estimators determining positions of the receiver by jointly using the motion model and the measurement model 122b. Each position estimator includes its corresponding combination of the integer values of the carrier phase ambiguities to determine a joint probability distribution 135b of the position of the receiver with respect to the motion model and the measurement model 122b. In such a manner, the combinations of the integer values of the carrier phase ambiguities can be evaluated probabilistically, because the measurement models of at least some different position estimators include different combinations of integer values of the carrier phase ambiguities selected from the set of possible combinations 125b. Next, the method determines 140b the position of the receiver by a combination of position estimators according to a function 145b of probabilities of the different position estimators according to the measurements of the carrier and the code signals. For instance, in one embodiment the position of the receiver is determined using a position estimator with the highest joint probability of the position of the receiver according to the measurements of the carrier and the code signals.

To that end, some embodiments are based on realization that estimation of the range of possible integer values of carrier phase ambiguities as well as the selection of the integer values of carrier phase ambiguities from that range can be done probabilistically using consistency of the motion and the measurement models with respect to a PDF of the noise of the measurement model.

Figure 1C:
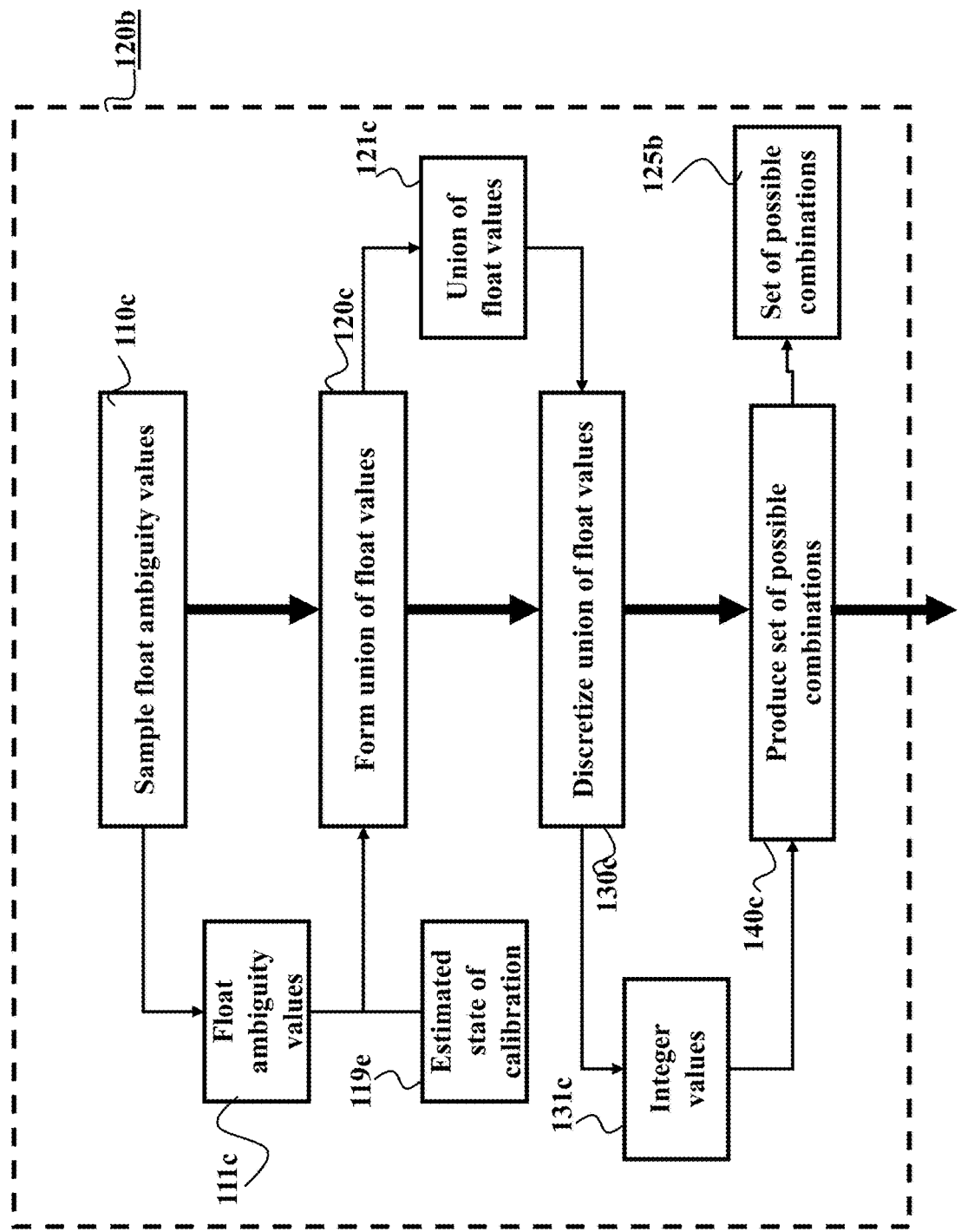
FIG. 1C shows a flowchart of a method for determining the possible combinations of integer values of the carrier phase ambiguities according to some embodiments.

FIG. 1C shows a flowchart of a method for determining 120b the possible combinations of integer values of the carrier phase ambiguities according to some embodiments. The method can be implemented using a processor. For at least one position of the receiver consistent with the process noise of the motion model, the method samples 110c float values 111c of the carrier phase ambiguity, for at least one satellite, on a PDF of the measurement noise centered on a noiseless fit of the carrier phase ambiguities, the position, and the measurements of the carrier and code signals into the measurement model.

In some embodiments, the PDF of the measurement noise is predetermined based on, e.g., characteristics of the GNSS receiver. As used herein, the noiseless fit is the fit of the carrier phase ambiguities, the position, and the measurements of the carrier and code signals, when the obtained measurements of the carrier and code signals are assumed to be correct. That is, the measurements of the carrier and code signals are assumed to be correct and the remaining errors are due to the carrier phase ambiguity. In such a manner, the noiseless fit places the PDF in a position that the sampling on the PDF deemphasize the probabilistic noise of the motion and the measurement models and emphasize the effect of the carrier phase ambiguities on the position estimation. In other words, the errors in the fit to the measurement model after inserting carrier phase ambiguities, the position, and the measurements of the carrier and code signals into the measurement model, is due to the error in the carrier phase ambiguities.

Then, the method forms 120c a union of the sampled float values, to produce a union 121c that contains all of the sampled float values; discretizes 130c the union of float values in an integer basis to produce possible integer values 131c of the carrier phase ambiguity for the set of GNSS satellites. Finally, the method uses the possible integer values 131c of carrier phase ambiguities for all satellites, to produce 140c a set of possible combinations 125b of integer values.

Figure 1D:
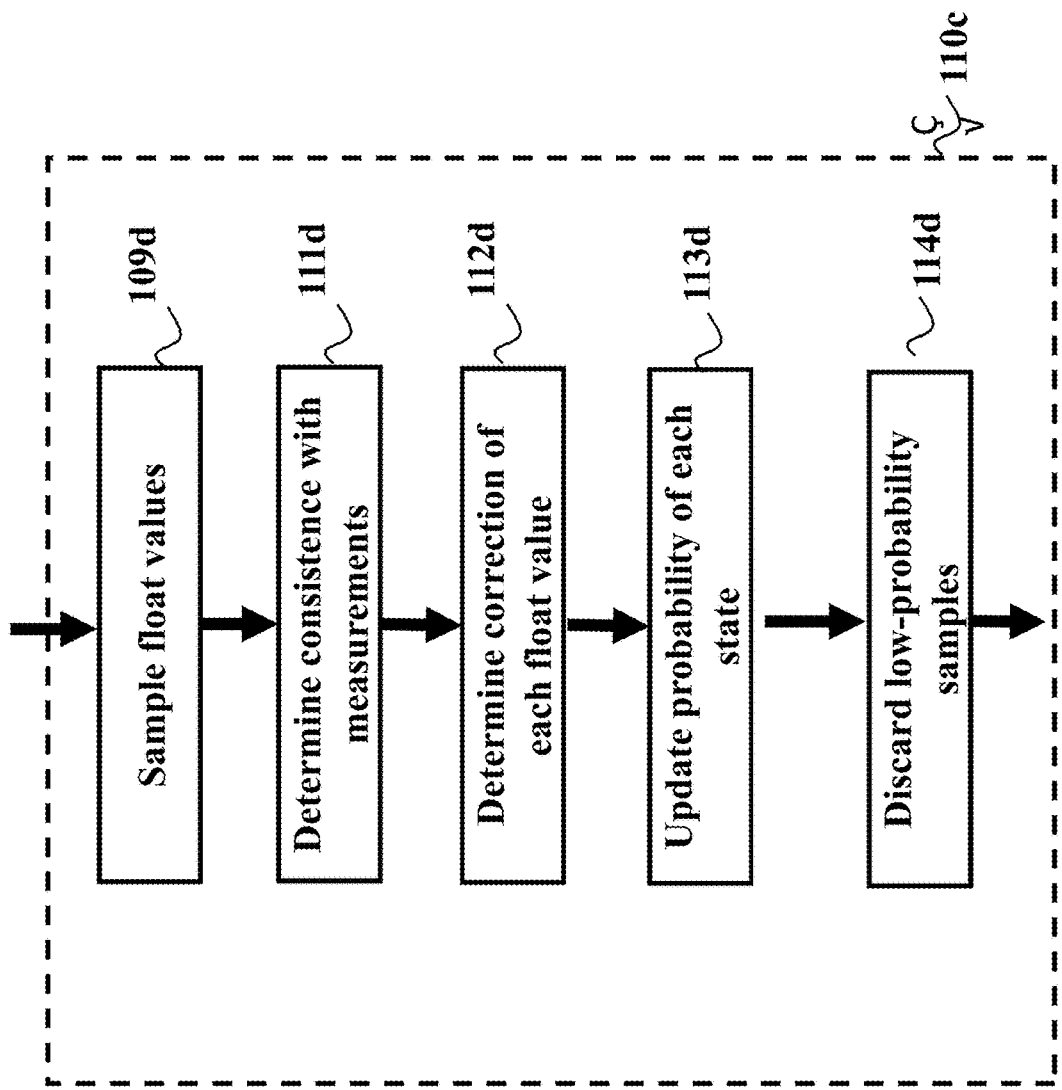
FIG. 1D shows a flowchart of an exemplar implementation of a method that samples the float values according to one embodiment.

FIG. 1D shows a flowchart of an exemplar implementation of the method 110c that samples the float values according to one embodiment. However, the sampling 110c the float values are implemented in several ways by different embodiments. The method of FIG. 1D samples 109d float values consistent with the motion model and its process noise. The method determines 111d consistence with the measurements of the code and carrier phase signals, by inserting sampled carrier phase ambiguities, the estimated position, and the measurements of the carrier and the code signals into the measurement model. Based on the consistence with the measurement, the method corrects 112d each sampled float value as a function of the process noise and the measurement noise; updates 113d the probability of each ambiguity based on the consistence with the measurements after correction; and prunes 114d the corrected sampled float values of carrier phase ambiguities to preserve the float values of carrier phase ambiguities with probabilities of fitting into the measurement model above a threshold.

Figure 1E:
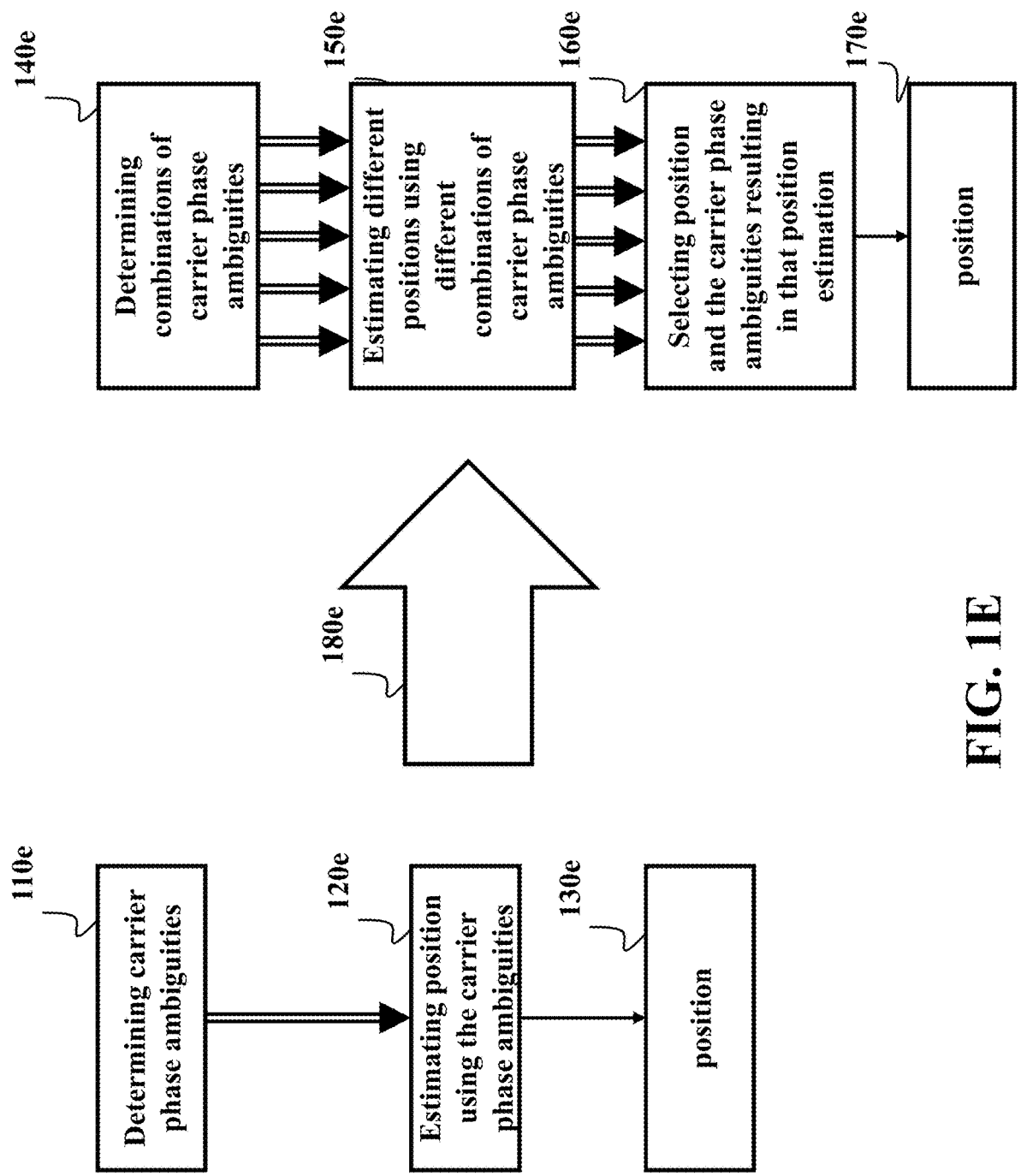
FIG. 1E shows a schematic illustrating some principles employed by some embodiments.

FIG. 1E shows a schematic illustrating some principles employed by some embodiments. Specifically, some embodiments are based on realization that the finite number of possible integer values of carrier phase ambiguity allows to determine 140e different combinations of those possible integer values for tracking the position of the GNSS receiver. Such a realization allows to replace 180e the evaluation 110e of the carrier phase ambiguity for estimating 120e the position 130e of the GNSS receiver with the evaluation 160e of different positions of the GNSS receiver determined 150e using different the combinations 140e of the carrier phase ambiguities. This replacement is advantageous, because the probabilistic nature of the motion of the receiver is better equipped to test the position than to test derivative of the position, such as the carrier phase ambiguity. In such a manner, the best position 170e selected using the probabilistic nature of the motion of the receiver automatically indicate the corresponding combination of the carrier phase ambiguity used to determine such a position 170e.

Figure 2A:
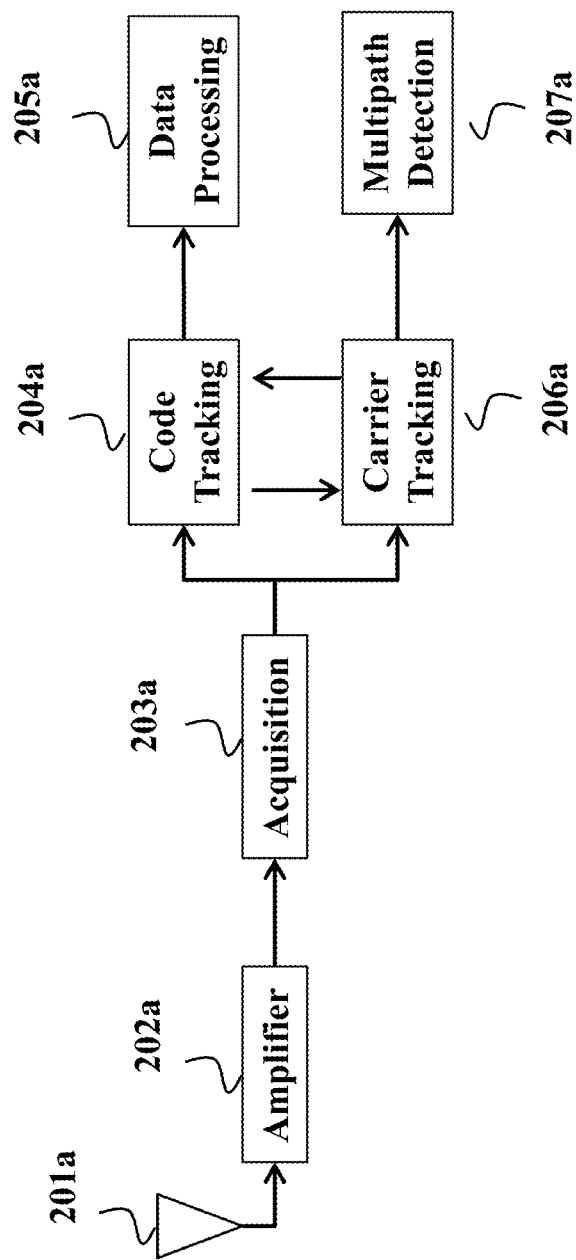
FIG. 2A shows a block diagram of a receiver used by some embodiments.

FIG. 2A shows a block diagram of a receiver used by some embodiments. In those embodiments, the measurements to detect the presence of multipath 207a are natively computed in the receiver as part of the process by which position is estimated. After the antenna 201a, and before acquisition 203a, the received signal is made up of the sum of the signals emitted by each satellite. An amplifier 202a is designed to strengthen the signal for further processing. The acquisition 203a initializes the tracking process by supplying estimates for the phase and frequency of each received satellite signal. The tracking unit is tasked with estimating and providing measurements of the phase and frequency of each satellite signal over time for the carrier wave 206a and for code tracking 204a. The code tracking 204a is used to determine and process 205a the data messages. The carrier wave tracking 206a is used to determine the multipath 207a.

Referring to FIG. 1D, in some embodiments the sampling the float values is performed recursively, for each time step. However, it is not necessary to sample the float values at each time step. For instance, if there is no indication of that the value of the carrier phase ambiguity has changed, there is no reason to sample new float values. Some embodiments use the detection of multipath 207a to initiate sampling the float values. Doing in such a manner ensures that computational effort is not wasted.

Some GNSS receivers can have several antennae for a single receiver, but combinations of several antennae with as many receivers are conceivable. One embodiment uses multiple antennae with as many receivers as antennae. The antennae are spatially separated, which allows the receivers to detect differences between the observed carrier frequencies on the same satellite signal.

Figure 2B:
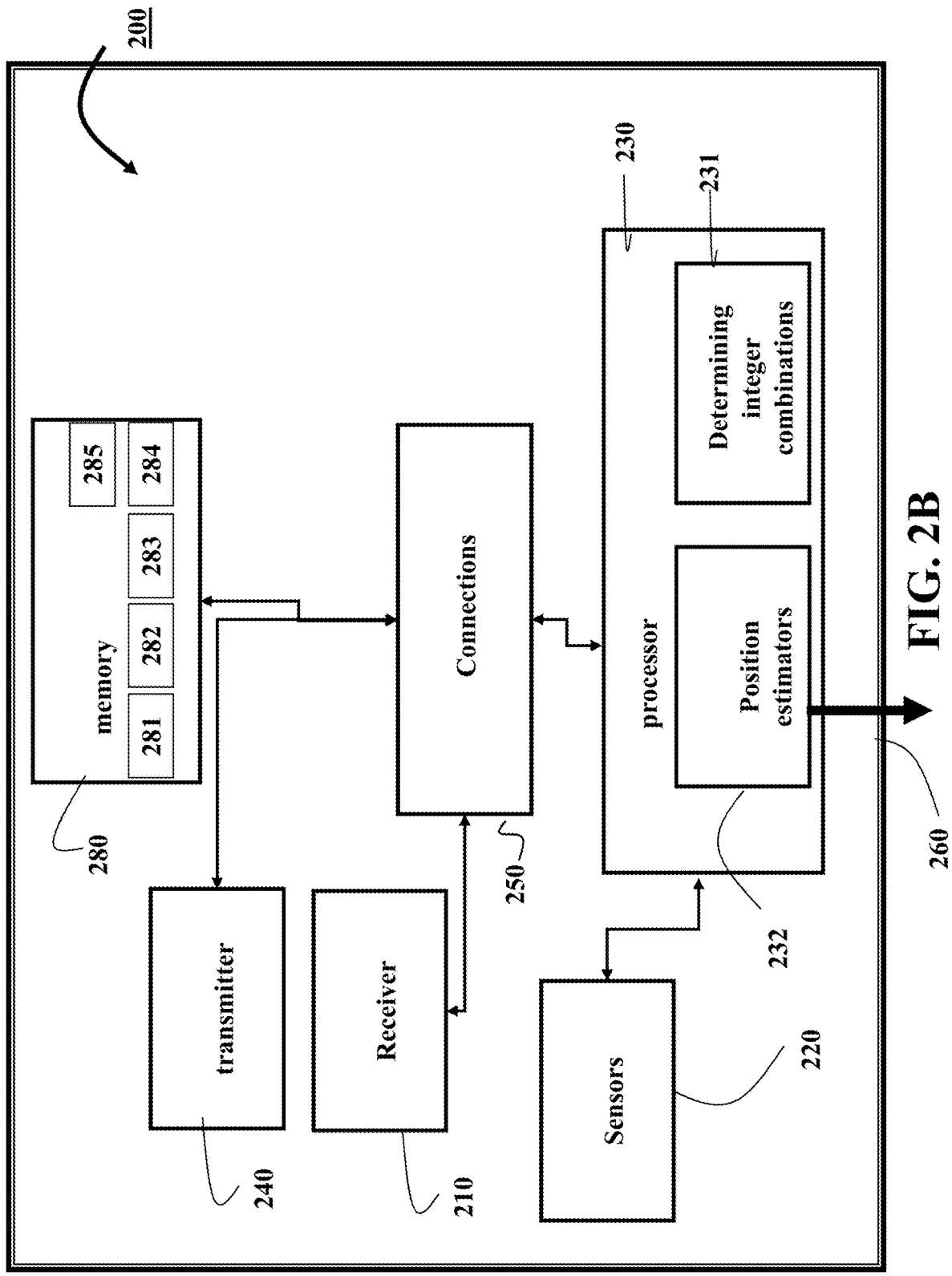
FIG. 2B shows a block diagram of a positioning system for a GNSS according to some embodiments.

FIG. 2B shows a block diagram of a positioning system 200 for a GNSS according to some embodiments. The positioning system 200 includes a receiver 210 to receive carrier signals and code signals transmitted from a set of GNSS satellites, each carrier signal includes a carrier phase ambiguity as an unknown integer number of wavelengths of the carrier signal traveled between the satellite and the receiver. The system 200 can be implemented internal to a number of devices on which the receiver 210 is located, such as handheld devices, cars, airplanes, or trains. Additionally, or alternatively, the system 200 can be communicatively connected to the device.

The system also includes a memory 280 storing a motion model 281 relating a previous position of the receiver to a current position of the receiver and a measurement model 282 relating measurements of the carrier and code signals received by the receiver 210 to the current position of the receiver using the carrier phase ambiguities of the carrier signals. Due to the inherent random noise and errors of the satellite transmitter and receiver 210, the motion model and the measurement model are probabilistic, thus allowing several possible values of the carrier phase ambiguity at any given epoch to be consistent with those models with different probabilities. The memory 280 can also store 284a set of possible combinations of integer values described by other embodiments.

The system 200 can include additional sensors 220 that can help in aiding the positioning system. For instance, the sensors 220 can include an inertial measurement unit (IMU), a camera, wheel encoders if mounted in a wheeled vehicle, a laser. For example, when connected to a car, the IMU and wheel encoders can be used in a motion model of the vehicle to increase accuracy of the positioning system beyond what otherwise would be possible.

The system 200 includes a processor 230 for tracking the position of the receiver. Further, the processor 230 is configured to determine 231 a set of possible combinations of integer values of the carrier phase ambiguities consistent with the measurements of the carrier and the code signals according to one or combination of the motion model and the measurement model within bounds defined by one or combination of the process noise and the measurement noise, where the determining 231 is described by other embodiments of the invention. Also, the processor 230 is configured to execute and/or run a set of position estimators 232 determining positions of the receiver 210 by jointly using the motion model 281 and the measurement model 282. Each position estimator determines a joint probability distribution of the position of the receiver 210 with respect to the motion model 281 and the measurement model 282 and can be run by the processor 230 concurrently and/or sequentially with other position estimators.

The measurement models of at least some different position estimators 232 include different combinations 231 of integer values of the carrier phase ambiguities selected from the set of possible combinations. For example, each position estimator 232 uses a measurement model 282 with its corresponding and unique combination of integer values of the carrier phase ambiguities selected from the integer combinations 231. Next, the processor determines 260 the position of the receiver using a position estimator with the highest joint probability of the position of the receiver according to the measurements of the carrier and the code signals. In such a manner, the estimation of the carrier phase ambiguities is moved outside of the position estimator 232, which is advantageous because it allows linear position estimators to work with non-linear change of the carrier phase ambiguities.

The IMU can include 3-axis accelerometer(s), 3-axis gyroscope(s), and/or magnetometer(s). The IMU can provide velocity, orientation, and/or other position related information to the processor 230. In some embodiments, the IMU can output measured information in synchronization with the capture of each image frame from a camera. In some embodiments, the output of the IMU is used in part by the processor 230 to fuse the sensor measurements and/or to further process the fused measurements.

The system 200 can include a transmitter 240 enabled to transmit one or more signals. For instance, the transmitter 240 can send the position of the receiver 210 to other estimation methods, to be used in fusion with other sensors to improve accuracy. The receiver 210 and transmitter 240 can receive and transmit over one or more types of wireless communication networks. The receiver 210 and transmitter 240 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 200 can also include one or more ports for communicating over wired networks, such as the controller area network (CAN) bus.

The memory 280 can store 285 carrier phase measurements, as well as data provided by the sensors 220. For example, in some implementations, the memory 280 stores a geometry of the physical construction on which the receiver is mounted 284, and a geometrical relationship between the satellites and the receivers 283. In general, the memory 280 can represent any data storage mechanism. The memory 280 can include, for example, a primary memory and/or a secondary memory. The primary memory can include, for example, a random access memory, read only memory, etc. While illustrated in FIG. 2B as being separate from the processors 230, it should be understood that all or part of a primary memory can be provided within or otherwise co-located and/or coupled to the processors 230.

The different components in the system 200 can be operatively coupled to other each other through connections 250. The connections 250 can comprise buses, lines, fibers, links or combination thereof.

The processor 230 can be implemented using a combination of hardware, firmware, and software. The processor 230 can represent one or more circuits configurable to perform at least a portion of a computing procedure or process related to sensor fusion and/or methods for further processing the fused measurements. The processor 230 retrieves instructions and/or data from memory 280. The processor 230 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

In some embodiments, the state of the receiver evolves dynamically in time according to a model of the motion of the state of the receiver. In some embodiments, the model of the motion of the receiver is a general-purpose kinematic constant-acceleration model with the state vector $x_k=[p_{r,k}\ v_{r,k}\ a_{r,k}]^T$, where the three components are the position, velocity, and acceleration of the receiver. With this notation, the kinematic constant-acceleration model is $$x_{k+1} = \begin{bmatrix} I & T_s I & \frac{T_s^2}{2}I \\ 0 & I & T_s I \\ 0 & 0 & I \end{bmatrix} x_k + \begin{bmatrix} \frac{T_s^3}{6_2}I \\ \frac{T_s^2}{2}I \\ T_s I \end{bmatrix} w_{x,k},$$

where $w_{x,k}$ is the process noise and $T_s$ is the sampling, time of the system. In other embodiments, tailored models are used. For instance, when the receiver is mounted in a vehicle, a specific model describing the time evolution of the vehicle is preferable.

In other embodiments, the time evolution of the ambiguity is modeled as $n_{k+1}=n_k+w_{n,k}$, $w_{n,k} \sim \mathcal{N}(0, Q_n)$, where $n_{k+1}$ is the ambiguity and $w_{n,k}$ is the Gaussian process noise with covariance $Q_n$.

Some embodiments realize that the ambiguities can change instantaneously, for instance, due to a loss-of-lock occurring from a cycle-slip, loss-of-sight in urban areas, or from moving below a power line. Therefore, any model of the motion of the ambiguity can be uncertain. To this end, one embodiment sets the process covariance of the ambiguity to a large number such that the float values of carrier phase ambiguities are sampled according to the measurements of the carrier and code signals.

In some embodiments, the positioning system uses the carrier phase single difference (SD) and/or double difference (DD) for estimating a position. When a carrier signal transmitted from one satellite is received by two receivers the difference between the first carrier phase and the second carrier phase is referred as the single difference (SD) in carrier phase. Using pairs of receivers, 131 and 130 in FIG. 1A, the difference between SDs in carrier phase obtained from the radio signals from the two satellites is called the double difference (DD) in carrier phase. When the carrier phase difference is converted into the number of wave length, for example, λ=19 cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

FIG. 3 shows the various variables that are used alone or in combination in the modeling of the motion and/or measurement model according to some embodiments. Some embodiments model the carrier and code signals with the measurement model $$P_k^j = \rho_k^j + c(\delta T_k - \delta t_k^j) + I_k^j$$

$$T_j^k + \epsilon_k^j,$$

$$\Phi_k^j = \rho_k^j + c(\delta t_k - \delta t_k^j) - I_k^j$$

$$T_k^j + \lambda N^j + \eta_k^j,$$

where $P_k^j$ is the code signal from the jth satellite at time step k, $\rho^j = \sqrt{(p_X^j - p_{X,r})^2 + (p_Y^j - p_{Y,r})^2 + (p_Z^j - p_{Z,r})^2}$, with notation as in FIG. 3.

By utilizing a base receiver b mounted at a known location broadcasting to the original receiver r, most of the sources of error can be removed. For instance, one embodiment forms the difference between the two receivers 130 and 131 in FIG. 1A, from which the error due to the satellite clock bias can be eliminated. Another embodiment forms a double difference between two satellites j and l as $$\nabla \Delta P_{br,k}^{jl} = \Delta P_{br,k}^j - \Delta P_{br,k}^l$$
$$= \nabla \Delta \rho_{br,k}^{jl} + \nabla \Delta I_{br,k}^{jl} + \nabla \Delta \epsilon_{br,k}^{jl},$$

$$\nabla \Delta \Phi_{br,k}^{jl} = \Delta \Phi_{br,k}^j - \Delta \Phi_{br,k}^l$$
$$= \nabla \Delta \rho_{br,k}^{jl} - \nabla \Delta I_{br,k}^{jl} + \lambda \nabla \Delta N_{br}^{jl} + \nabla \Delta \eta_{br}^{jl},$$

where $\nabla \Delta (\bullet)_{br,k}^{jl}$ is the double difference operator. Doing in such a manner, clock error terms due to the receiver can be removed. Furthermore, for short distances between the two receivers (e.g., 30 km), the ionospheric errors can be ignored, leading to $$\nabla \Delta P_{br,k}^{jl} = \Delta P_{br,k}^j - \Delta P_{br,k}^l$$
$$\approx \nabla \Delta \rho_{br,k}^{jl} + \nabla \Delta \epsilon_{br,k}^{jl},$$

$$\nabla \Delta \Phi_{br,k}^{jl} = \Delta \Phi_{br,k}^j - \Delta \Phi_{br,k}^l$$
$$\approx \nabla \Delta \rho_{br,k}^{jl} + \lambda \nabla \Delta N_{br}^{jl} + \nabla \Delta \eta_{br,k}^{jl}.$$

Some embodiments capture the carrier and code signals in the measurement model $y_k = h_k + \lambda \bar{n}_k + e_k$, where $e_k$ is the measurement noise, where the measurement noise of the code signal is much larger than the carrier noise. However, the code signal does not exhibit an ambiguity.

Other embodiments estimate the PDF of the state and ambiguities by a set of N particles, resulting in the PDF $p(x_k, n_{0:k}|y_{0:k})$, where $y_{0:k}$ are the measurements of the carrier and code signals. For instance, one embodiment represents the PDF of the ambiguity conditioned on the carrier and code measurements as $$p(n_{0:k} | y_{0:k}) \approx \sum_{i=1}^{N} q_k^i \delta(n_{0:k}^i - n_{0:k}),$$

where $q_k^i$ is the probability of the ith sampled float ambiguity.

Figure 4A:
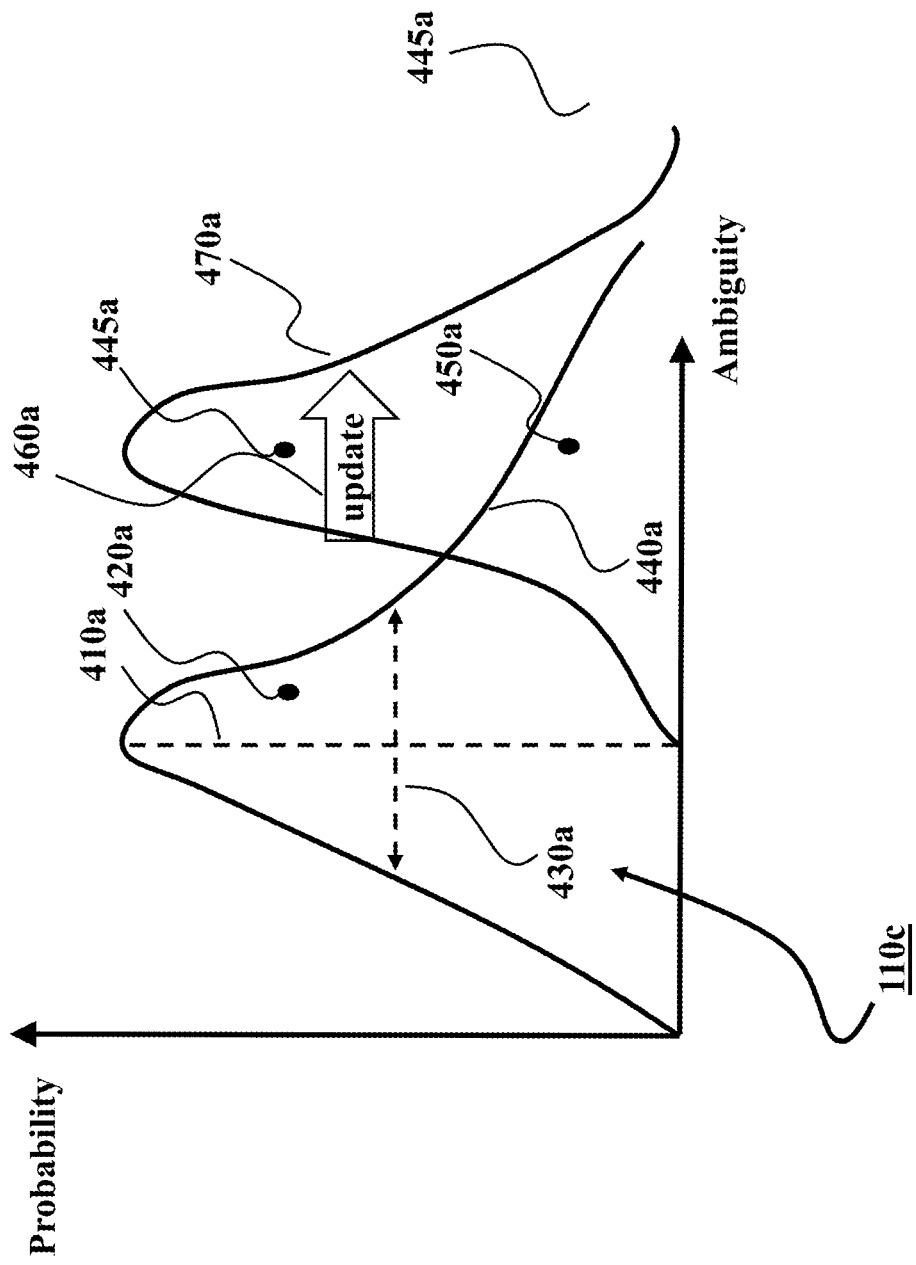
FIG. 4A shows a graph illustrating probability distribution function defining the feasible space of the possible ambiguities according to some embodiments.

FIG. 4A shows a graph illustrating probability distribution function 440a defining the feasible space 400a of the possible ambiguities according to one embodiment. The shape of the function 440a can be determined in advance. For example, if the distribution of the ambiguities is Gaussian, the shape of the distribution 440a is the "Gaussian hat" shape. If the shape is fixed, the mean 410a and the variance 430a define the distribution 440a and the feasible space 400a from which the sample of the float values of carrier phase ambiguity can be drawn.

As used herein, in one embodiment, the sampling 110c of the carrier phase ambiguity is drawing with probabilities defined by the distribution 440a, which is in turn defined by a combination of the mean and the variance of the measurement noise and the process noise. However, in some embodiments the process noise of the evolution model of the ambiguities is much larger than the measurement noise, meaning that the distribution 440a is mostly capturing the PDF of the measurement noise. For example, according to the distribution 440a, the probability of a sample 420a to be drawn or sampled is higher than the probability of the sample 450a. On the other hand, the PDF 470a of the measurements indicate that the fit with the measurement model is poor. Such a representation allows correcting 460a the sample of the ambiguity to produce an updated sample 445a, which is more likely to be consistent with the measurements, hence better representing the true ambiguity. As another example, if the distribution 440a is defined by the PDF of the measurement noise, because the process noise is sufficiently large, the sampled value will be determined only using the PDF of the measurement noise and the PDFs 440a and 470a coincide.

Figure 4B:
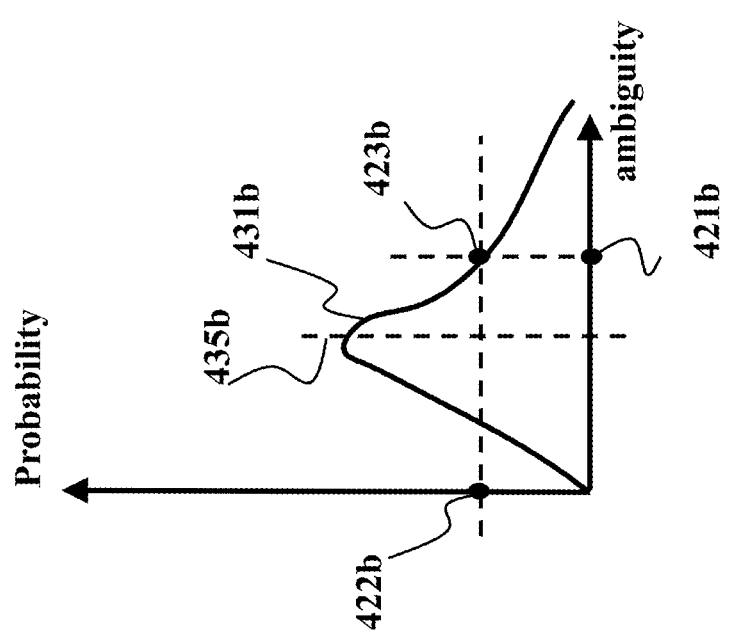
FIG. 4B shows a graph illustrating selection of the probability of the sampled ambiguities according to some embodiments.

FIG. 4B shows a graph illustrating selection of the probability of the sampled ambiguities using the PDF 431b over possible states of the receiver according to one embodiment. For example, the PDF 431b can be a probability distribution of the measurement model. The shape of such a probability distribution can be determined in advance, e.g., as a Gaussian or different shape, and the location of this probability distribution 431b is centered on the noiseless fit of the measured state 435b. As defined herein, the noiseless fit is the fit of the carrier phase ambiguities, the position, and the measurements of the carrier and code signals, when the obtained measurements of the carrier and code signals are assumed to be correct. That is, the measurements of the carrier and code signals are assumed to be correct and the remaining errors are due to the errors in carrier phase ambiguity.

One embodiment determines a probability distribution of the state of the receiver and/or the ambiguity using a probability distribution 431b of the measurement model centered on the measured state. To that end, the embodiment can determine the probability of each sampled ambiguity to represent the true ambiguity according to a placement of the ambiguity and the estimated position on the probability distribution of the state of the receiver and the ambiguity.

For example, the embodiment submits the sample of the corrected ambiguity to the model of the measurements of the carrier and code signal. The embodiment selects a value 422b of the PDF over states of the receiver at a point 423b corresponding to the fit of the measurement model with the ambiguity 421b to the measured state as the probability of the ambiguity to be accurate.

In some embodiments, when the probability of a sampled ambiguity is lower than a threshold, the corresponding ambiguity is removed from the determining and is replaced with a sampled ambiguity with higher probability. Doing in such a manner ensures that only sampled ambiguities that are more likely to be the correct ambiguity can be chosen.

In other embodiments, the sampled ambiguity is determined by first; drawing a sample from the process noise, then; using the sampled process noise correcting the sample by a Kalman-type correction $$p(n_k | n_{k-1}^i, y_{0:k}) \approx \mathcal{N}\left(n_k | \hat{n}_k^i, \left(\sum_k^i\right)^{-1}\right),$$

$$\hat{n}_k^i = n_{k-1}^i + K_k^i(y_k - \hat{y}_{k|k-1}^i),$$

$$\sum_k^i = ((S_k^i)^{-1} + (Q_n)^{-1})^{-1},$$

$$K_k^i = Q_n(Q_n + S_k)^{-1},$$

$$\hat{y}_{k|k-1}^i = h(\hat{x}_{k|k-1}^i) + \lambda \bar{n},$$

that is, every sampled ambiguity is corrected with the difference from the measurement, $\dot{y}_k$ and the fit $\hat{y}_{k|k-1}^i$ of the measurement model using the sampled ambiguity and the estimated position corresponding to the sampled ambiguity. With this correction, the probability of the ambiguity is determined from the probabilistic measurement model as a Gaussian function of the process and measurement noise, the sampled ambiguity, and the estimated position.

Figure 4C:
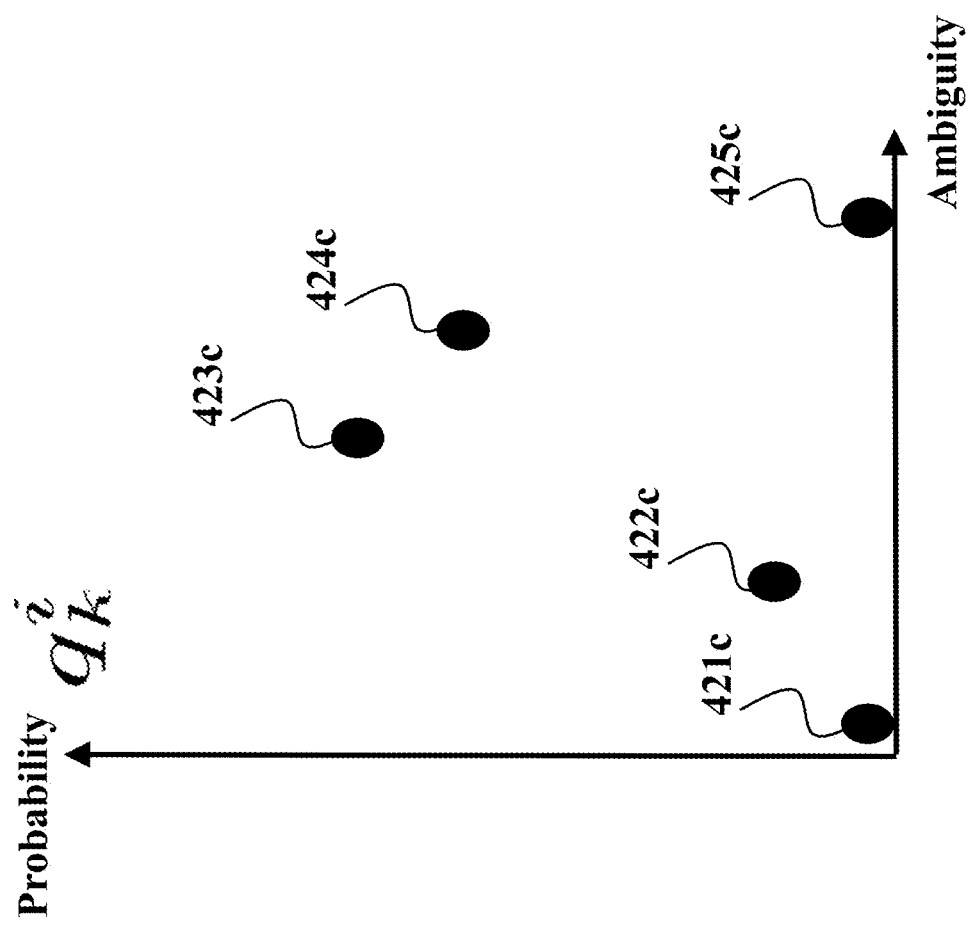
FIG. 4C shows the assigned probabilities of five ambiguities according to some embodiments.
Figure 4D:
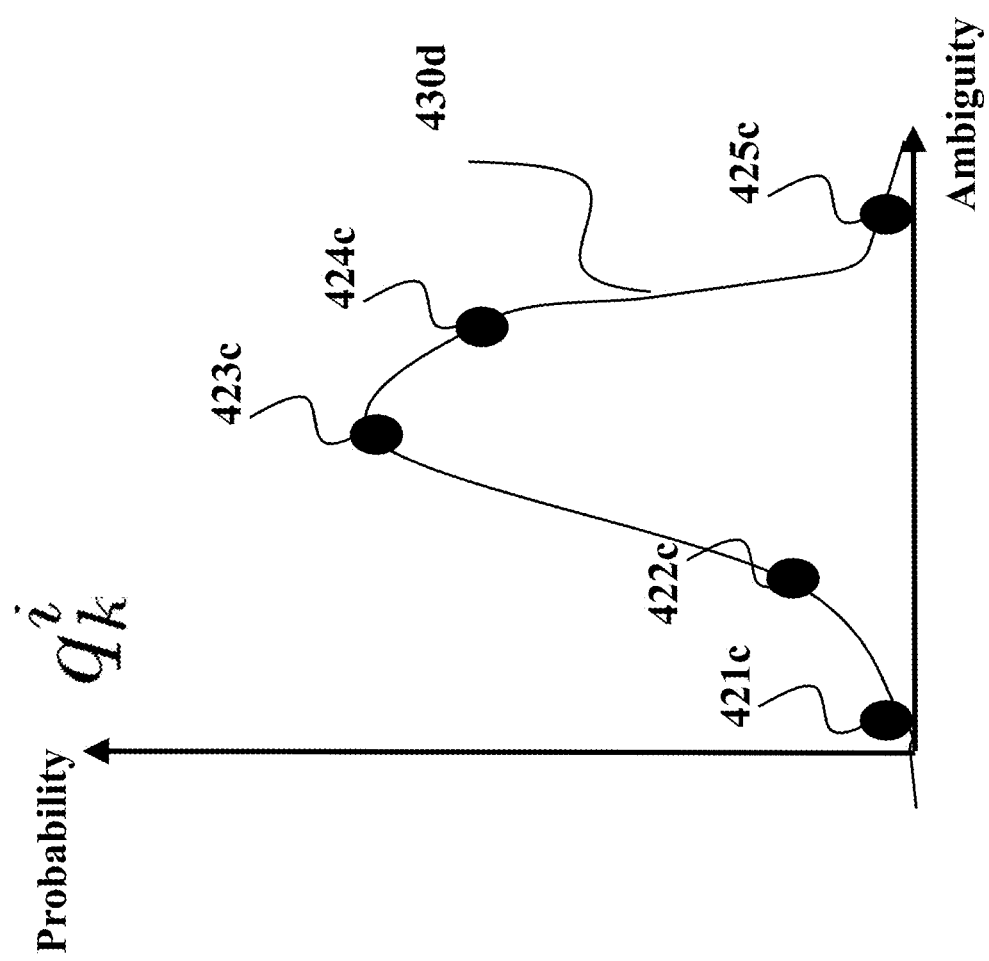
FIG. 4D shows an illustration of a result of a method for interpolating and extrapolating the probabilities of float values according to some embodiments.

FIG. 4C shows a schematic of probabilities of the float values of the carrier phase ambiguities sampled according to some embodiments. FIG. 4C shows five float values of the carrier phase ambiguities having the assigned probabilities 421c, 422c, 423c, 424c, and 425c. The probabilities constitute a discrete distribution different from the exact range of possible ambiguities. One embodiment interpolates and extrapolates the probabilities of the float values of the carrier phase ambiguities to form a continuous probability density function and selects at least one section of the continuous probability density function above the threshold as a range of the integer values of the carrier phase ambiguities FIG. 4D shows an illustration of a result of a method for interpolating and extrapolating the probabilities of float values of the carrier phase ambiguities sampled according to some embodiments. The interpolating connects a curve 430d between the points, and the extrapolating makes the curve 430d extend beyond the discrete points.

Figure 4E:
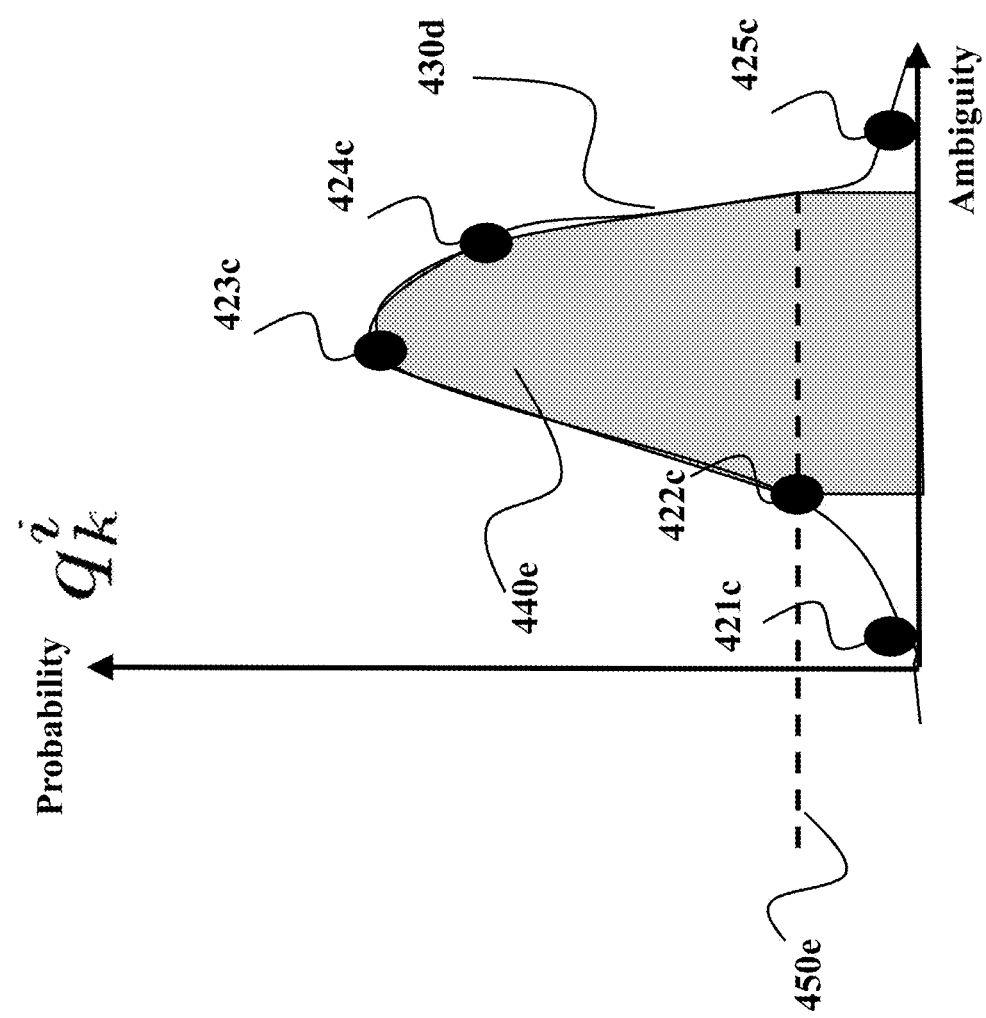
FIG. 4E shows an illustration of selecting regions of the probability distribution according to some embodiments.

In some embodiments, a section of the curve 430d is selected. For instance, FIG. 4E shows a situation where the region 440e is selected, which means that the ambiguity values corresponding to the region forms the basis of the set of possible integer values. The selecting can be done in several ways. For instance, one embodiment selects the section of the continuous PDF that is above the threshold 450e.

Figure 4F:
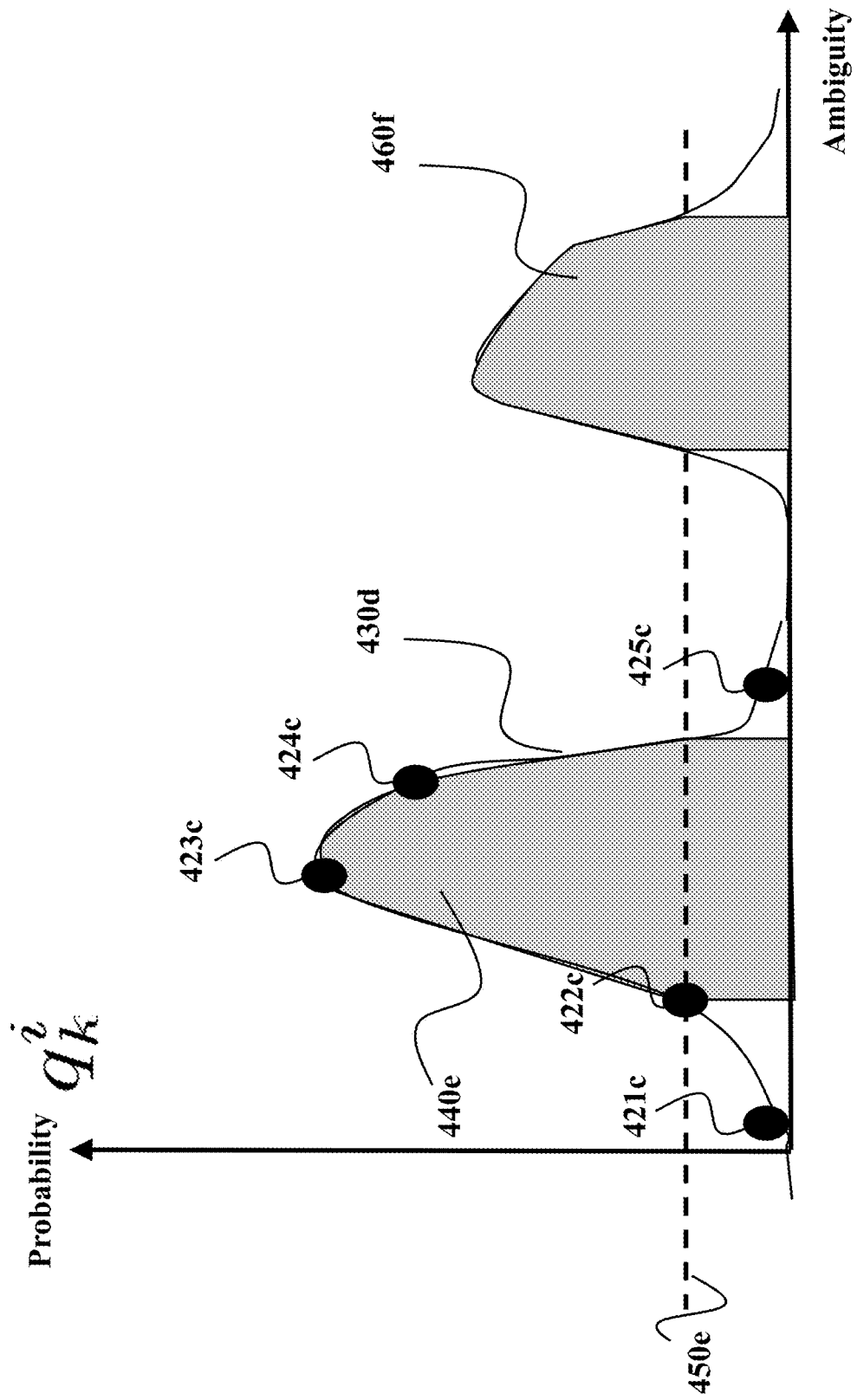
FIG. 4F shows selecting several regions for a bimodal distribution according to some embodiments.

FIG. 4F shows a case where the PDF is bimodal according to one embodiment. In this case, the embodiment determines two ranges 440e and 470f of ambiguities. Additionally, or alternatively, some embodiments determine the continuous PDF using a kernel density smoother.

Figure 5A:
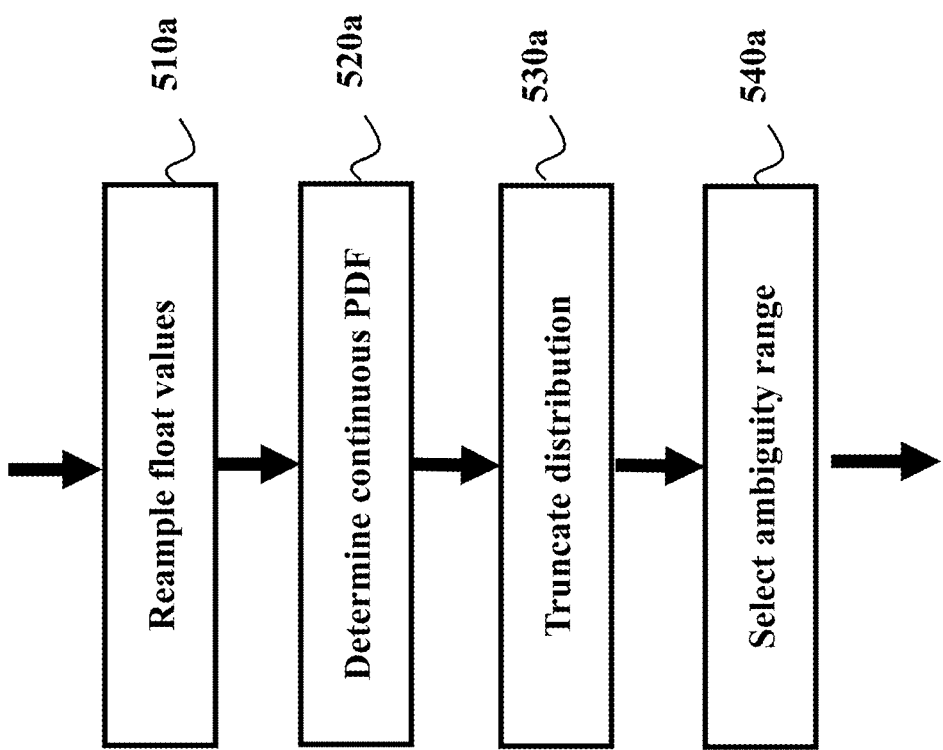
FIG. 5A shows a flowchart of a method for determining the continuous distribution according to some embodiments.

FIG. 5A shows a flowchart of a method for determining the continuous distribution according to one embodiment. The method resamples 510a the ambiguities to get an equally weighted distribution $$p(n_k | y_{0:k}) \approx \hat{p}(n_k | y_{0:k}) = \frac{1}{N}\sum_{i=1}^{N} \delta(n_k^i - n_k).$$

For instance, one embodiment resamples the sampled ambiguities according to their discrete probabilities. Then, the method determines 520a the continuous distribution using a kernel density smoother, resulting in the continuous PDF $$\hat{p}_K(n_k | y_{0:k}) = \frac{1}{N}\sum_{i=1}^{N} K_h(n_k^i - n_k),$$

where $K_h(\bullet)$ is the kernel density and h is the bandwidth of the kernel. The kernel can be chosen in several ways, for instance, as a Gaussian kernel, a uniform kernel, a triangular, or other. Based on the threshold 450e in FIG. 4E, the method truncates 530a the distribution and selects 540a the range based on the truncated PDF.

Based on the selected integer values, one embodiment executes a set of position estimators, where each position estimator uses a unique set of ambiguities in the measurement model. For instance, one embodiment uses a set of Kalman filters that estimate the position using the motion model and adjust the estimated position using the measurement model with the measurements of the carrier and the code signals adjusted according to the integer values of the carrier phase ambiguities selected for the position estimator. The Kalman filter determines the joint probability of the position based on a consistency of the adjusted position with the measurement model.

For instance, in one embodiment the Kalman filter estimates the position and velocity and associated covariance as $$\hat{x}_{k+1|k} = F_k \hat{x}_{k|k},$$

$$P_{k+1|k} = F_k P_{k|k} F_k^T + Q_{x,k},$$

and adjusts the estimated position and covariance based on the carrier and code signal measurements as $$\hat{x}_{k|k} = \hat{x}_{k|k-1} + K_k(y_k - h_k - \lambda \bar{n}_k),$$
$$P_{k|k} = P_{k|k-1} - K_k H_k P_{k|k-1},$$
$$S_k = H_k P_{k|k-1} H_k^T + R_k,$$
$$K_k = P_{k|k-1} H_k^T S_k^{-1},$$
$$H_k = \left.\frac{\partial h(x)}{\partial x}\right|_{x=\hat{x}_{k|k-1}},$$

where the ambiguity n is a vector of ambiguities, unique for each different Kalman filter.

The executing the Kalman filters result in a mixture distribution of Gaussian distributions, $$p(x_k | y_{0:k}) = \sum_{i=1}^{N_s} \omega_k^i \mathcal{N}(x_k | \hat{x}_{k|k}^i, P_{k|k}^i),$$

where the $N_s$ different Kalman filters each produce a Gaussian distribution. The distribution of the position is a weighted distribution, where each weight $\omega_k^i$ reflects how good the position estimate is, therefore also it reflects how good the choice of integer ambiguities is.

One embodiment determines the weight as the probability of the particular choice of integer ambiguity values, that is, $\omega_k^i = p(n^i|y_{0:k})$. Another embodiment determines the probability of the particular choice of ambiguity integer values as the value when inserting the estimates from the Kalman filter into a Gaussian distribution, weighted with the probability of the ambiguity in the previous time step, $\omega_k^i \propto \omega_{k-1}^i \mathcal{N}(y_k|\hat{y}_{k|k-1}^i, S_k^i)$.

The determined weights can be used to determine the position estimate. For instance, one embodiment outputs the position estimate that is determined as a weighted combination of the estimates of all the Kalman filter, $$\hat{x}_{k|k}^{MV} = \sum_{i=1}^{N_s} \omega_k^i \hat{x}_{k|k}^i.$$

In other embodiments, the estimate is determined from the Kalman filter associated with the highest weight $\omega_k^i$.

Sometimes the set of possible combinations of integer values can change, for instance, due to loss-of-lock of a satellite for a period of time, receving signals from more satellites, or multipath detection.

Figure 5B:
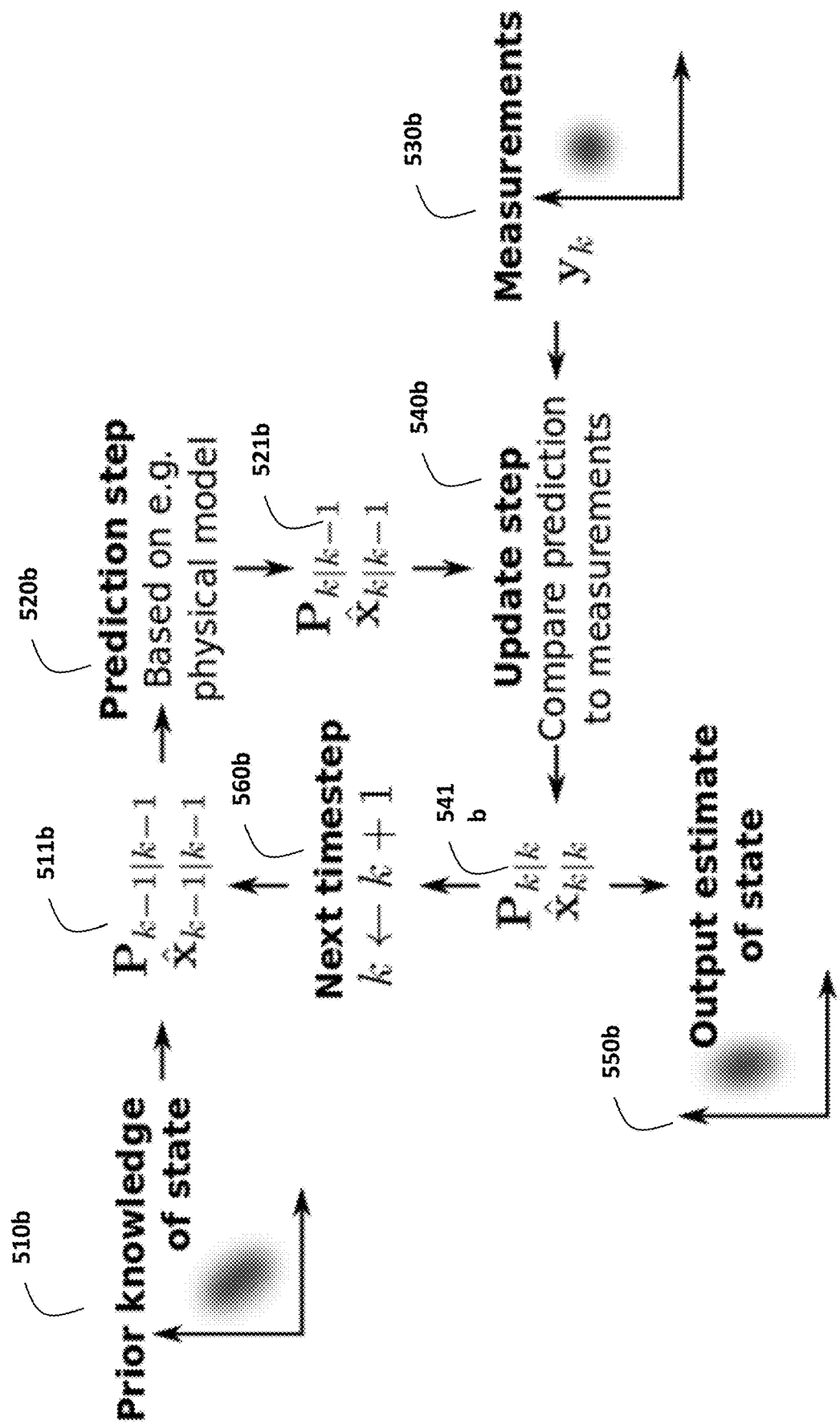
FIG. 5B shows a schematic of the Kalman filter (KF) used by some embodiments for position estimation.

FIG. 5B shows a schematic of the Kalman filter (KF) used by some embodiments for position estimation. The KF is a tool for state estimation in linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 510b of the state, to determine a mean of the state and its variance 511b. The KF then predicts 520b the state and the variance to the next time step, using a model of the system, to obtain an updated mean and variance 521b of the state. The KF then uses a measurement 530b in an update step 540b using the measurement model of the system, to determine an updated mean and variance 541b of the state. An output 550b is then obtained, and the procedure is repeated for the net time step 560b.

Some embodiments execute multiple KFs in parallel, each KF has a motion model and a measurement model associated with a particular value of carrier phase ambiguity.

FIG. 5C shows a block diagram of the use of several KFs to probabilistically estimate the postion. Different KFs 510c, 520c, 530c, 540c estimate the position using the motion model and the measurement model, each KF associated with a different value of carrier phase ambiguity. The KFs estimate 511c,521c,531c,541c positions. Then, the probabilities of each KF is determined 550c, and the position estimate and value of carrier phase ambiguity 551c associated with the best KF is outputted.

Figure 6:
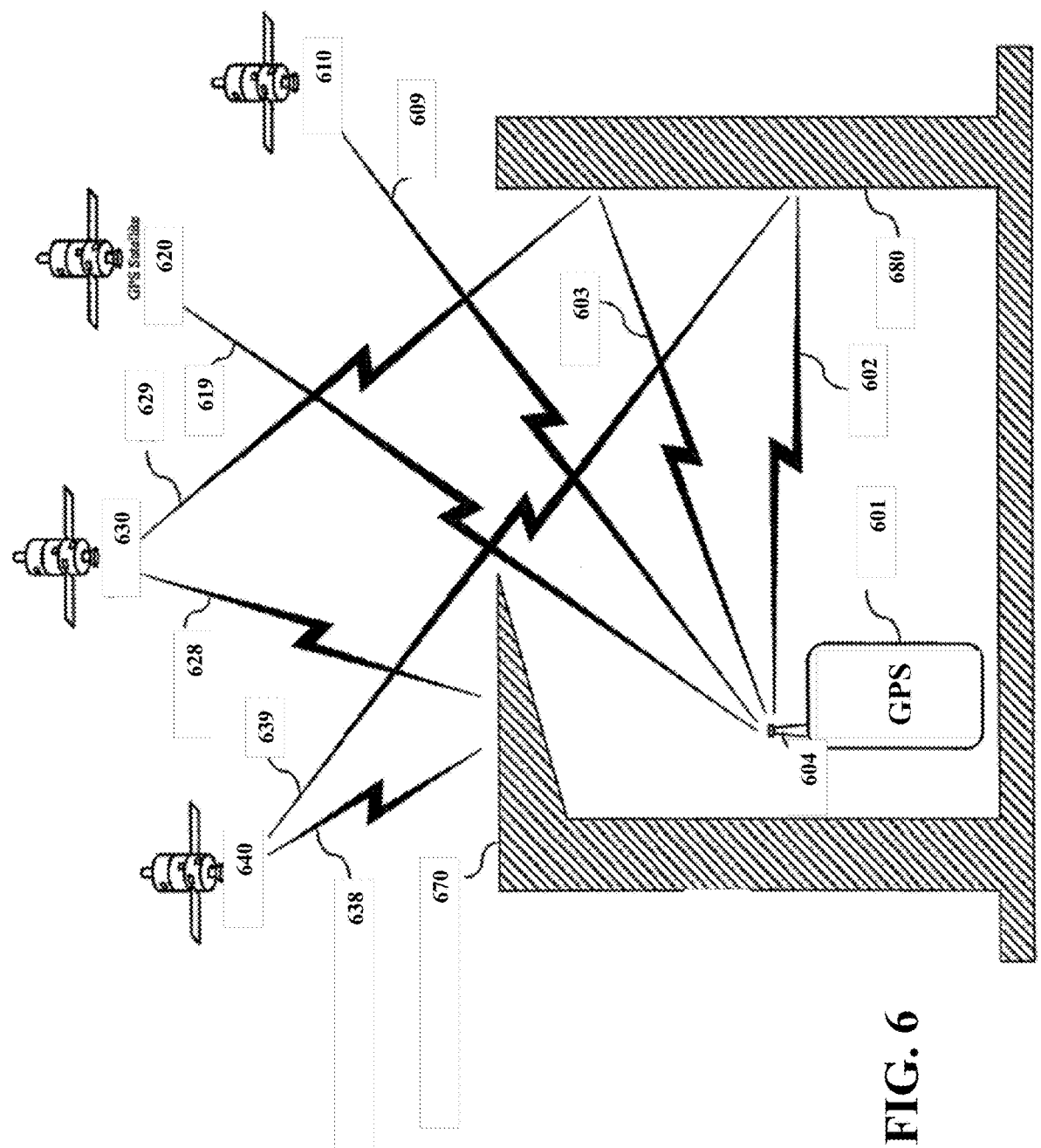
FIG. 6 shows an illustration of a scenario where the possible set of ambiguities can change according to some embodiments.

FIG. 6 shows an illustration of a scenario where the possible set of ambiguities can change as considered by some embodiments. A receiver 601 receives various signals 609 and 619 from satellites 610 and 620. There are other satellites 630 and 640 that transmits signals 628, 629, 638, 639, but due to an obstruction 670, for instance, a building in urban areas, these signals are not directly transmitted to the receiver.

Previously, the signal 638 sent from the satellite 640 was not available, but suddenly the satellite signal 639 reaches the receiver after a multipath 602. One embodiment detects the change of possible ambiguity values in response to the detection of a new satellite or a multipath, from which the new set of possible combinations is determined. The loss-of-lock can cause a cycle-slip, in one embodiment, this is detected and the set of possible combinations of integer values is updated based on the detection.

When initializing the position estimate, there may be little information about where the receiver is located. Sometimes it is possible to acquire a coarse information from the base receiver, a car navigation system, or Wi-Fi stations. One embodiment samples positions around a first coarse estimate of the position to produce the positions of the receiver, where the spread of the sampling is consistent with the uncertainty of the model of the receiver.

Another source of error is loss of one or more satellites, from which position information is lost and the current estimate cannot be trusted. One embodiment resolves this by sampling positions of the receiver in a neighborhood of the most recent known position to produce the positions of the receiver consistent with the process noise of the motion model. For instance, one embodiment keeps track of the most recent known position estimate, samples around this estimate such that the samples are consistent with the process noise, and propagates the sampled position with the motion model.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A positioning system for a global navigational satellite system (GNSS), comprising:
    a receiver to receive and determine measurements of carrier signals and code signals transmitted from a set of GNSS satellites, wherein the measurements of each carrier signal include a carrier phase ambiguity as an unknown integer number of wavelengths of the carrier signal travelled between the satellite and the receiver;
    a memory to store a motion model relating a previous position of the receiver to a current position of the receiver and a measurement model relating the measurements of the carrier signals and the code signals to the current position of the receiver using the carrier phase ambiguities in the measurements of the carrier signals, wherein the motion model is a probabilistic model subject to process noise, and wherein the measurement model is a probabilistic model subject to measurement noise; and
    a processor to track a position of the receiver, the processor is configured to
        determine a set of possible combinations of integer values of the carrier phase ambiguities consistent with the measurements of the carrier signals and the code signals according to one or combination of the motion model and the measurement model within bounds defined by one or combination of the process noise and the measurement noise;
        execute a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and
        determine the position of the receiver using a position estimator with the highest joint probability of the position of the receiver according to the measurements of the carrier and the code signals.

2. The positioning system of claim 1, wherein the processor, for determining the set of possible combinations of integer values of the carrier phase ambiguities, is configured to
    sample, for one or multiple positions of the receiver consistent with the process noise of the motion model, float values of carrier phase ambiguity on a probability density function of the measurement noise centered on a noiseless fit of the carrier phase ambiguities, the position, and the measurements of the carrier signal and the code signal into the measurement model;
    form a union of float values of carrier phase ambiguity for the set GNSS of satellites;
    discretize the union of float values of carrier phase ambiguity in an integer basis to produce possible integer values of the carrier phase ambiguity for the set of GNSS satellites; and
    combine different possible integer values of the carrier phase ambiguity for different GNSS satellites to produce the set of possible combinations of integer values of the carrier phase ambiguities.

3. The positioning system of claim 2, wherein the processor prunes the sampled float values of carrier phase ambiguities to preserve the float values of carrier phase ambiguities with probabilities of fitting into the measurement model above a threshold.

4. The positioning system of claim 3, wherein the processor interpolates and extrapolates the probabilities of the float values of the carrier phase ambiguities to form a continuous probability density function and selects at least one section of the continuous probability density function above the threshold as a range of the integer values of the carrier phase ambiguities.

5. The positioning system of claim 4, wherein the processor interpolates and extrapolates the probabilities of the float values of the carrier phase ambiguities using a kernel density smoother.

6. The positioning system of claim 2, wherein the processor is configured to
    estimate the current position of the receiver; and
    sample positions of the receiver in a neighborhood of the current position to produce the positions of the receiver consistent with the process noise of the motion model.

7. The positioning system of claim 1, wherein the processor is configured to
    determine a new set of possible combinations of integer values of the carrier phase ambiguities consistent with new measurements of the carrier signal and the code signal;
    detect a change in the set of possible combinations of integer values of the carrier phase ambiguities when the new set of possible combinations of integer values of the carrier phase ambiguities differs from a previous set of possible combinations of integer values of the carrier phase ambiguities; and
    updates the set of position estimators in response to detecting the change in the set of possible combinations of integer values of the carrier phase ambiguities.

8. The positioning system of claim 7, wherein the processor updates the set of possible combinations of integer values of the carrier phase ambiguities in response to detecting a multipath of at least one carrier signal.

9. The positioning system of claim 1, wherein the each position estimator is a Kalman filter that estimates the position using the motion model and adjusts the estimated position using the measurement model with the measurements of the carrier signals adjusted according to the integer values of the carrier phase ambiguities selected for the position estimator, wherein the Kalman filter determines the joint probability of the position based on a consistency of the adjusted position with the measurement model.

10. The positioning system of claim 9, wherein the processor, during the tracking of the position of the receiver, selects positions estimated by different Kalman filters as the current position of the receiver.

11. The positioning system of claim 9, wherein the processor, during the tracking of the position of the receiver, determines a probability of the different Kalman filters to have the correct integer ambiguity values, wherein a weight for each Kalman filter is determined by a combination of the joint probability in a previous time step and a fit of the position estimate and the selected ambiguity to the measurement model.

12. The positioning system of claim 11, wherein the processor, during the tracking of the position of the receiver, selects the position estimate as the position estimated by the Kalman filter with the highest joint probability.

13. A method for position estimation for a global navigational satellite system (GNSS), wherein the method is performed by a processor coupled with stored instructions, the processor executing the instructions to carry out steps comprising:
- receiving, at a receiver operatively connected to the processor, carrier signals and code signals transmitted from a set of GNSS satellites, and determining measurements of said signals, wherein the measurements of each carrier signal include a carrier phase ambiguity as an unknown integer number of wavelengths of the carrier signal travelled between the satellite and the receiver;
- retrieving a motion model relating a previous position of the receiver to a current position of the receiver and a measurement model relating the measurements of the carrier signals and the code signals to the current position of the receiver using the carrier phase ambiguities in the measurements of the carrier signals, wherein the motion model is a probabilistic model subject to process noise, and wherein the measurement model is a probabilistic model subject to measurement noise;
- determining a set of possible combinations of integer values of the carrier phase ambiguities consistent with the measurements of the carrier signals and the code signals according to one or combination of the motion model and the measurement model within bounds defined by one or combination of the process noise and the measurement noise;
- executing a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and
- determining the position of the receiver using a position estimator with the highest joint probability of the position of the receiver according to the measurements of the carrier and the code signals.

14. The method of claim 13, wherein determining the set of possible combinations of integer values of the carrier phase ambiguities further comprising:
- sampling, for one or multiple positions of the receiver consistent with the process noise of the motion model, float values of carrier phase ambiguity on a probability density function of the measurement noise centered on a noiseless fit of the carrier phase ambiguities, the position, and the measurements of the carrier signal and the code signal into the measurement model;
- forming a union of float values of carrier phase ambiguity for the set GNSS of satellites;
- discretizing the union of float values of carrier phase ambiguity in an integer basis to produce possible integer values of the carrier phase ambiguity for the set of GNSS satellites; and
- combining different possible integer values of the carrier phase ambiguity for different GNSS satellites to produce the set of possible combinations of integer values of the carrier phase ambiguities.

15. The method of claim 14, further comprising:
- pruning the sampled float values of carrier phase ambiguities to preserve the float values of carrier phase ambiguities with probabilities of fitting into the measurement model above a threshold.

16. The method of claim 15, further comprising:
- interpolating and extrapolating the probabilities of the float values of the carrier phase ambiguities to form a continuous probability density function; and
- selecting at least one section of the continuous probability density function above the threshold as a range of the integer values of the carrier phase ambiguities.

17. The method of claim 13, wherein the each position estimator is a Kalman filter that estimates the position using the motion model and adjusts the estimated position using the measurement model with the measurements of the carrier signals adjusted according to the integer values of the carrier phase ambiguities selected for the position estimator, wherein the Kalman filter determines the joint probability of the position based on a consistency of the adjusted position with the measurement model.

18. The method of claim 17, wherein the processor tracks the position of the receiver for a sequence of time steps, and wherein for at least at some different time steps, positions are estimated by different Kalman filters as the current position of the receiver.

19. A non-transitory computer readable storage medium embodied thereon a program executable by a processor for performing a method, the method comprising:
- receiving, at a receiver operatively connected to the processor, carrier signals and code signals transmitted from a set of GNSS satellites, and determining measurements of said signals, wherein the measurements of each carrier signal include a carrier phase ambiguity as an unknown integer number of wavelengths of the carrier signal travelled between the satellite and the receiver;
- retrieving a motion model relating a previous position of the receiver to a current position of the receiver and a measurement model relating the measurements of the carrier signals and the code signals to the current position of the receiver using the carrier phase ambiguities in the measurements of the carrier signals, wherein the motion model is a probabilistic model subject to process noise, and wherein the measurement model is a probabilistic model subject to measurement noise;
- determining a set of possible combinations of integer values of the carrier phase ambiguities consistent with the measurements of the carrier signals and the code signals according to one or combination of the motion model and the measurement model within bounds defined by one or combination of the process noise and the measurement noise;
- executing a set of position estimators determining positions of the receiver by jointly using the motion model and the measurement model, each position estimator determines a joint probability distribution of the position of the receiver with respect to the motion model and the measurement model, wherein the measurement models of at least some different position estimators include different combinations of integer values of the carrier phase ambiguities selected from the set of possible combinations; and determining the position of the receiver using a position estimator with the highest joint probability of the position of the receiver according to the measurements of the carrier and the code signals.

20. The medium of claim 19, wherein determining the set of possible combinations of integer values of the carrier phase ambiguities further comprising:

sampling, for one or multiple positions of the receiver consistent with the process noise of the motion model, float values of carrier phase ambiguity on a probability density function of the measurement noise centered on a noiseless fit of the carrier phase ambiguities, the position, and the measurements of the carrier signal and the code signal into the measurement model;

forming a union of float values of carrier phase ambiguity for the set GNSS of satellites;

discretizing the union of float values of carrier phase ambiguity in an integer basis to produce possible integer values of the carrier phase ambiguity for the set of GNSS satellites; and combining different possible integer values of the carrier phase ambiguity for different GNSS satellites to produce the set of possible combinations of integer values of the carrier phase ambiguities.

* * * * *